Sept. 5, 1950 P. E. GELDHOF ET AL 2,521,159
AUTOMATIC WASHING, RINSING, AND DRYING MACHINE
Filed June 21, 1943 12 Sheets-Sheet 1
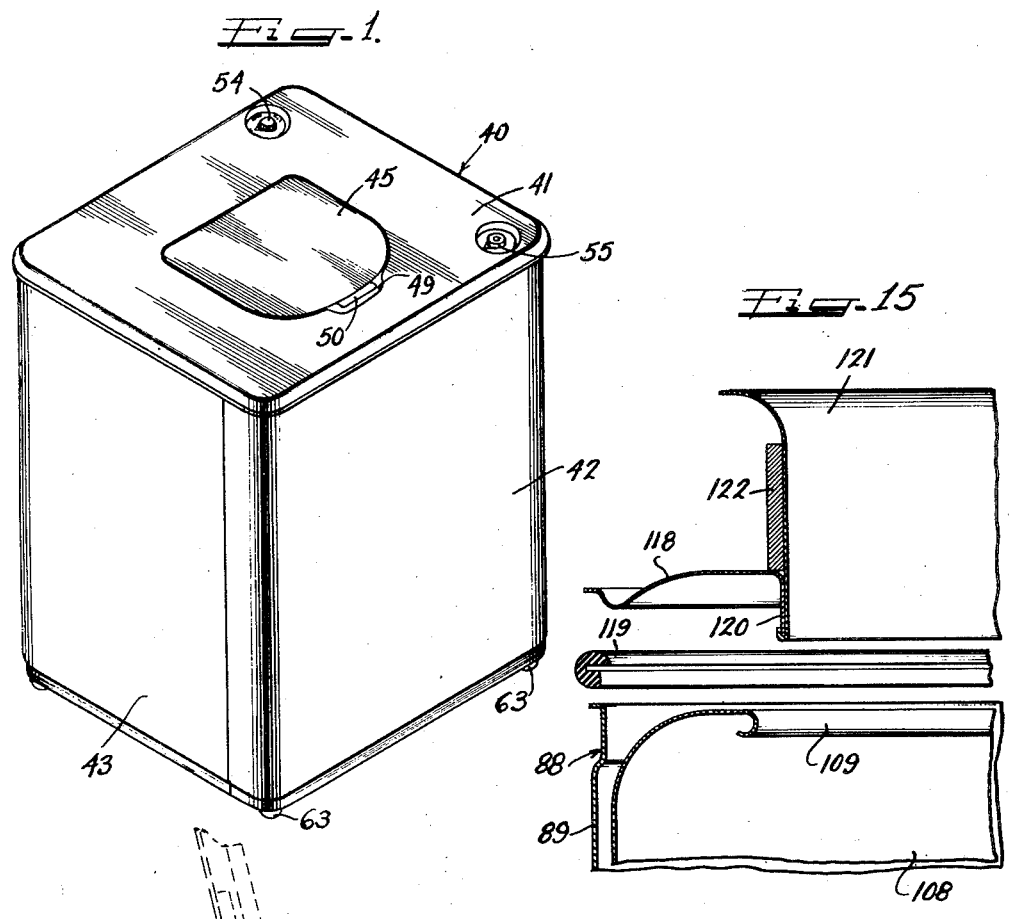
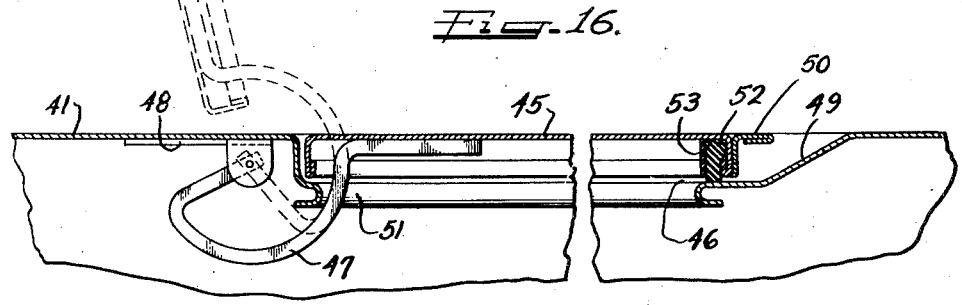
Inventors
PETER EDUARD GELDHOF.
LUTHER RINGER.
by Charles W Hills Attys.

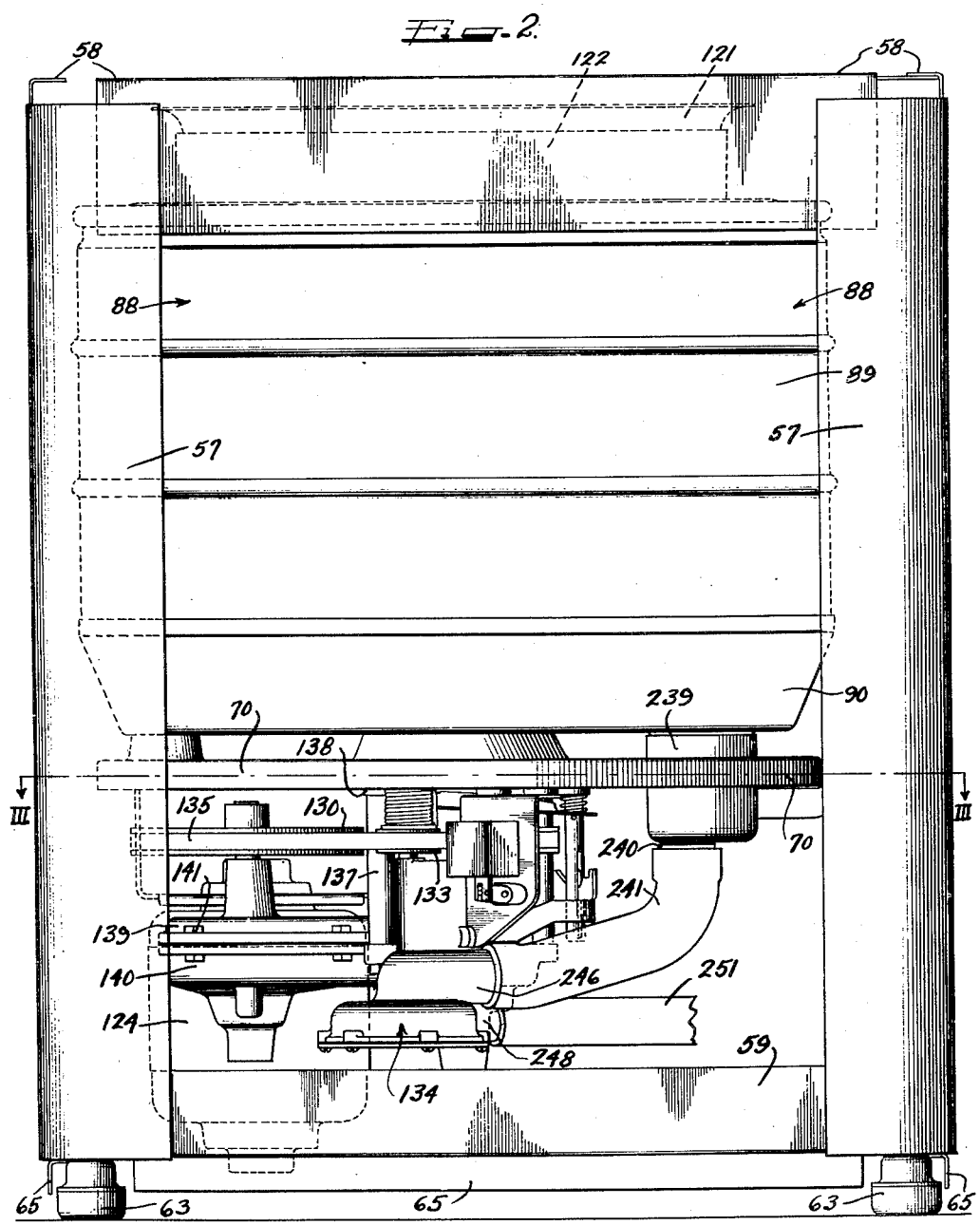

Sept. 5, 1950 P. E. GELDHOF ET AL 2,521,159
AUTOMATIC WASHING, RINSING, AND DRYING MACHINE
Filed June 21, 1943 12 Sheets-Sheet 3
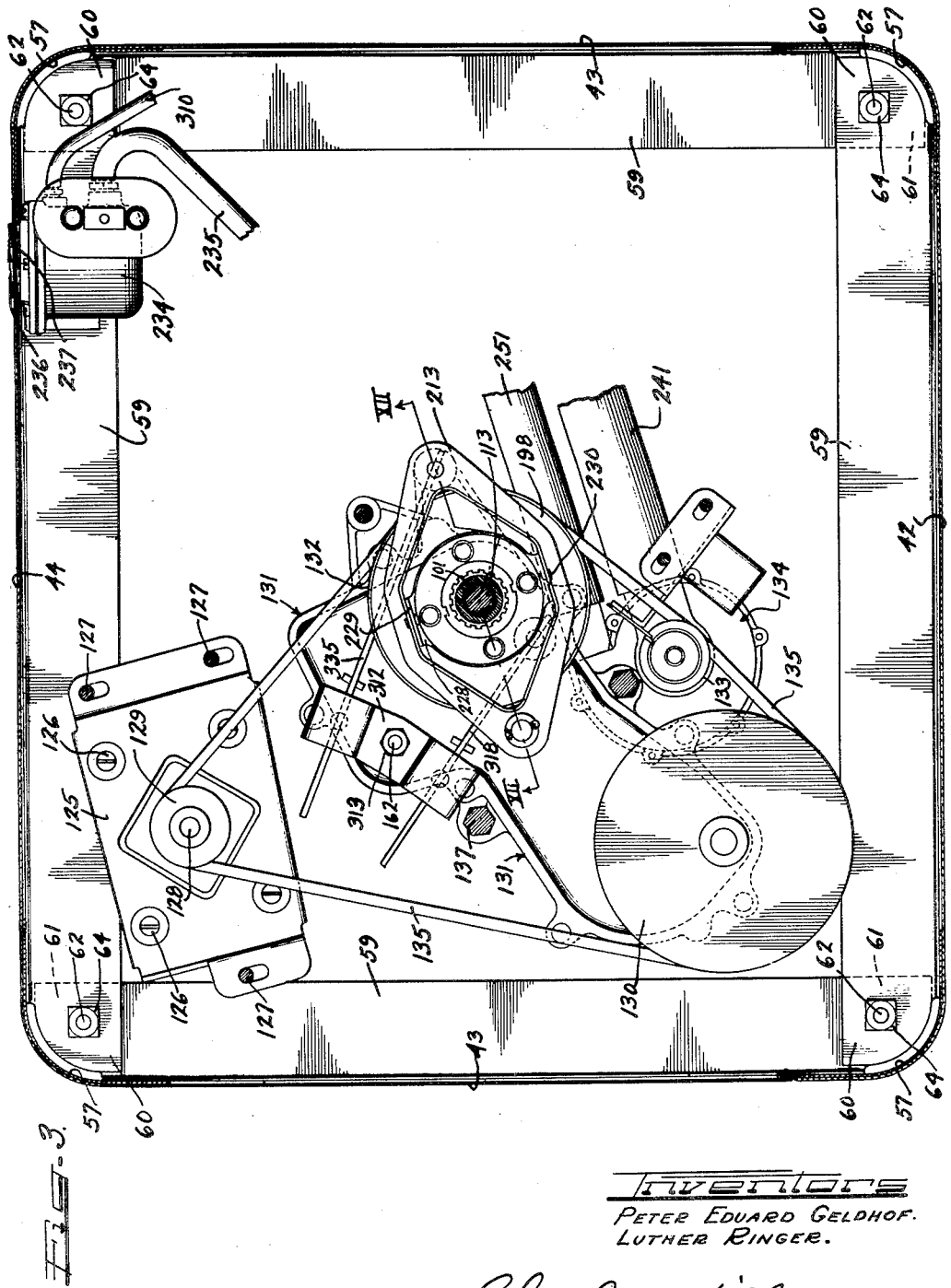
Inventors
PETER EDUARD GELDHOF.
LUTHER RINGER.
by Charles Hill Attys.

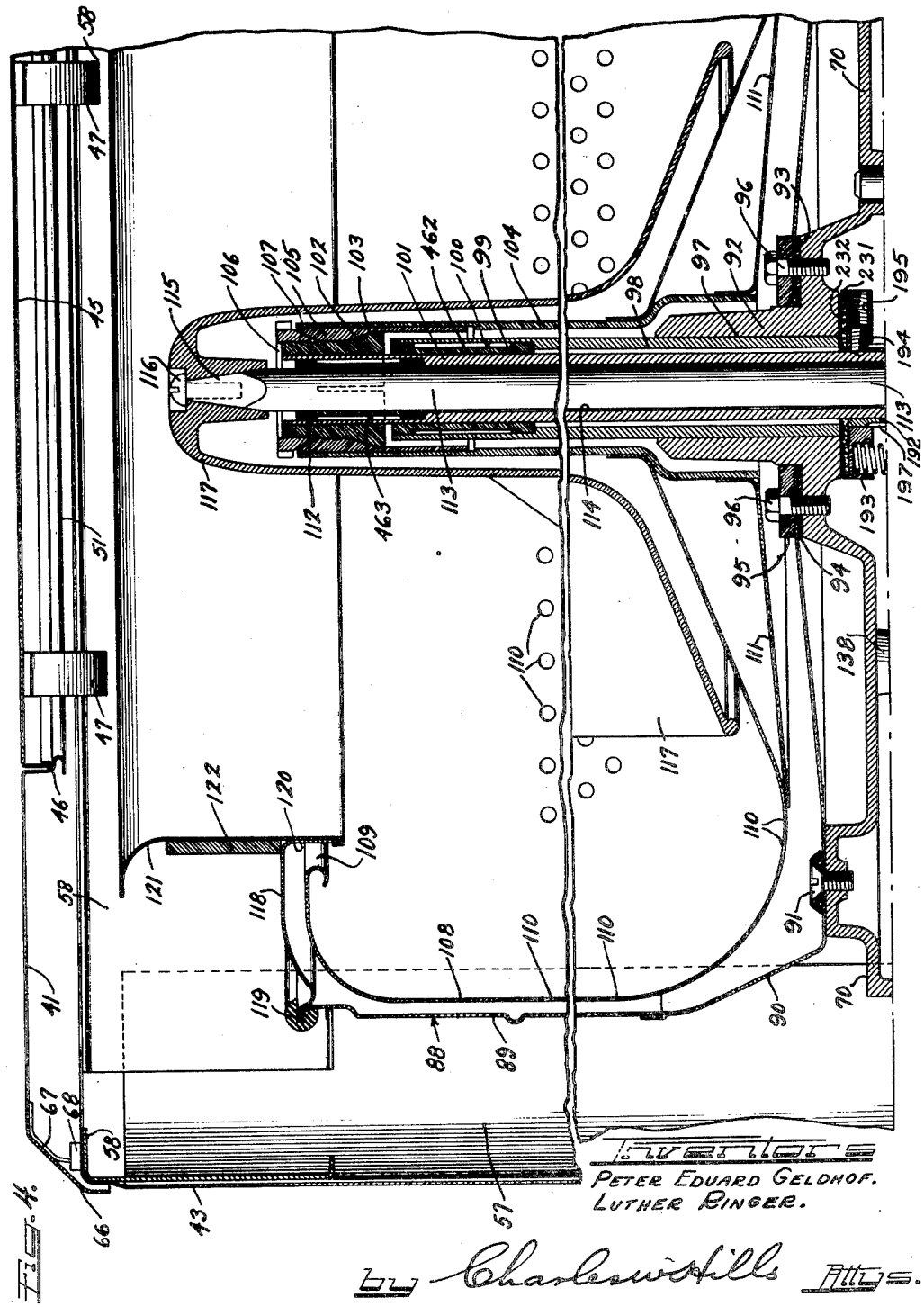

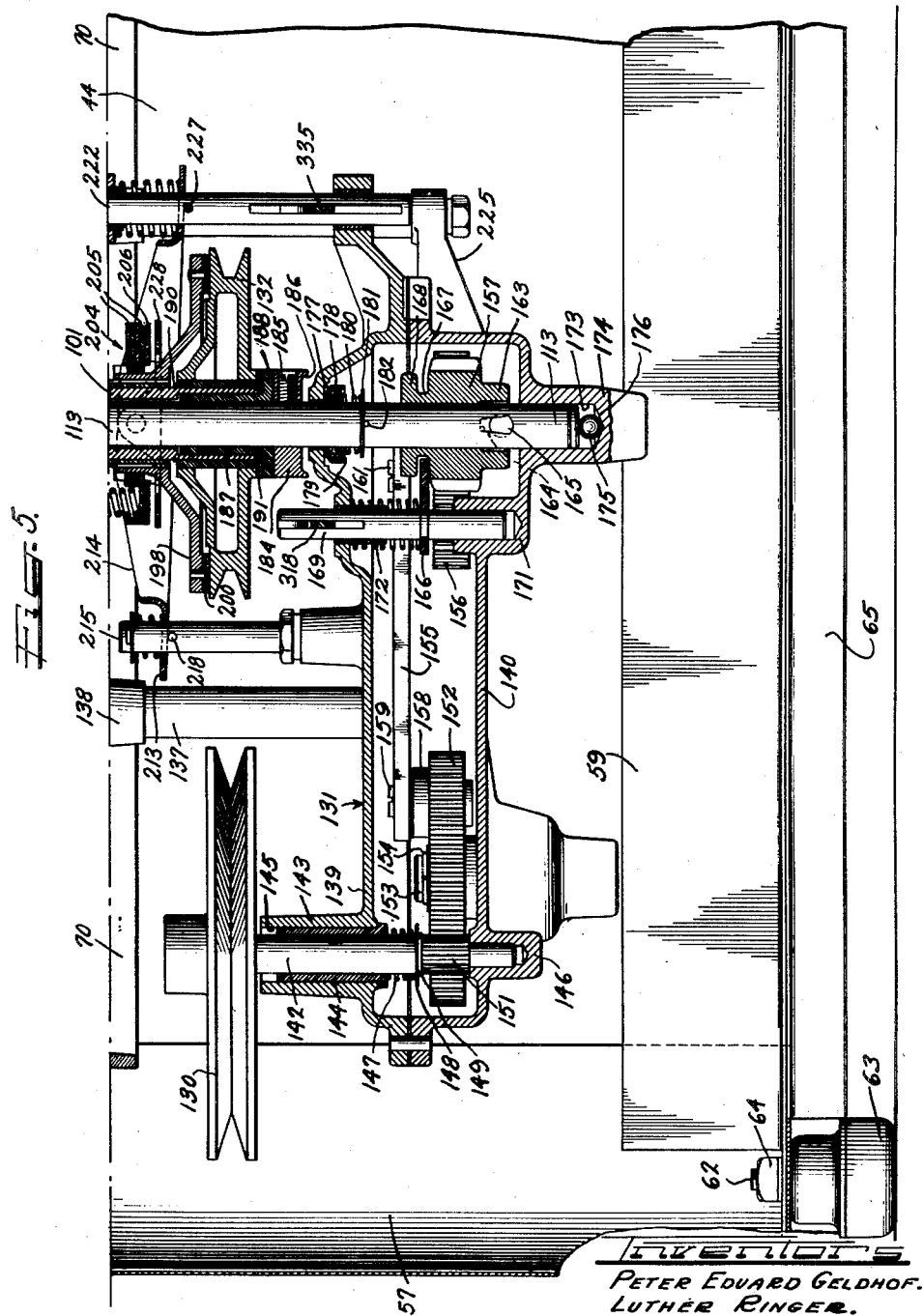

Sept. 5, 1950 P. E. GELDHOF ET AL 2,521,159
AUTOMATIC WASHING, RINSING, AND DRYING MACHINE
Filed June 21, 1943 12 Sheets-Sheet 6

Inventors
PETER EDUARD GELDHOF.
LUTHER RINGER.
by Charles W. Hills, Attys.

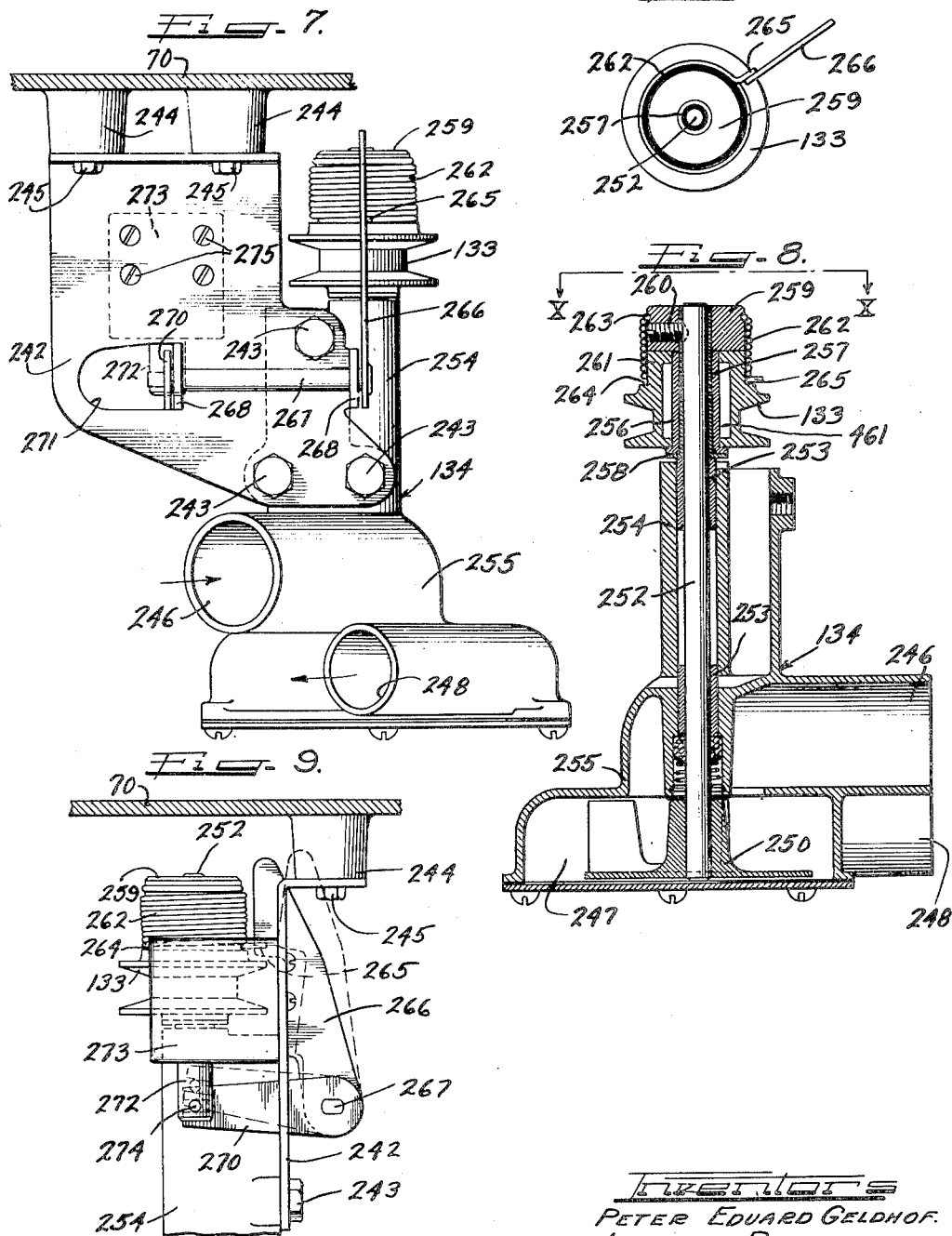

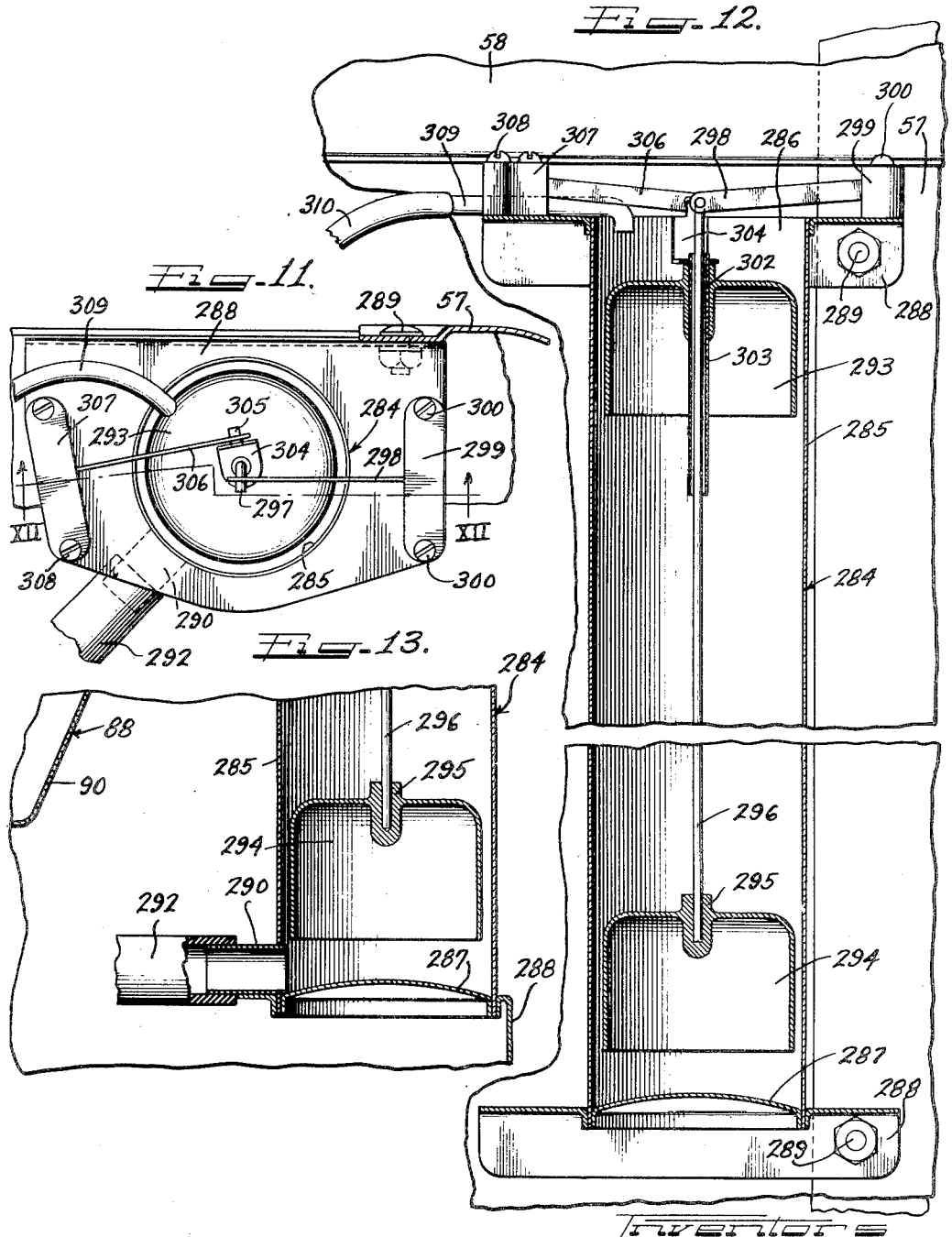

Sept. 5, 1950 P. E. GELDHOF ET AL 2,521,159
AUTOMATIC WASHING, RINSING, AND DRYING MACHINE
Filed June 21, 1943 12 Sheets-Sheet 9
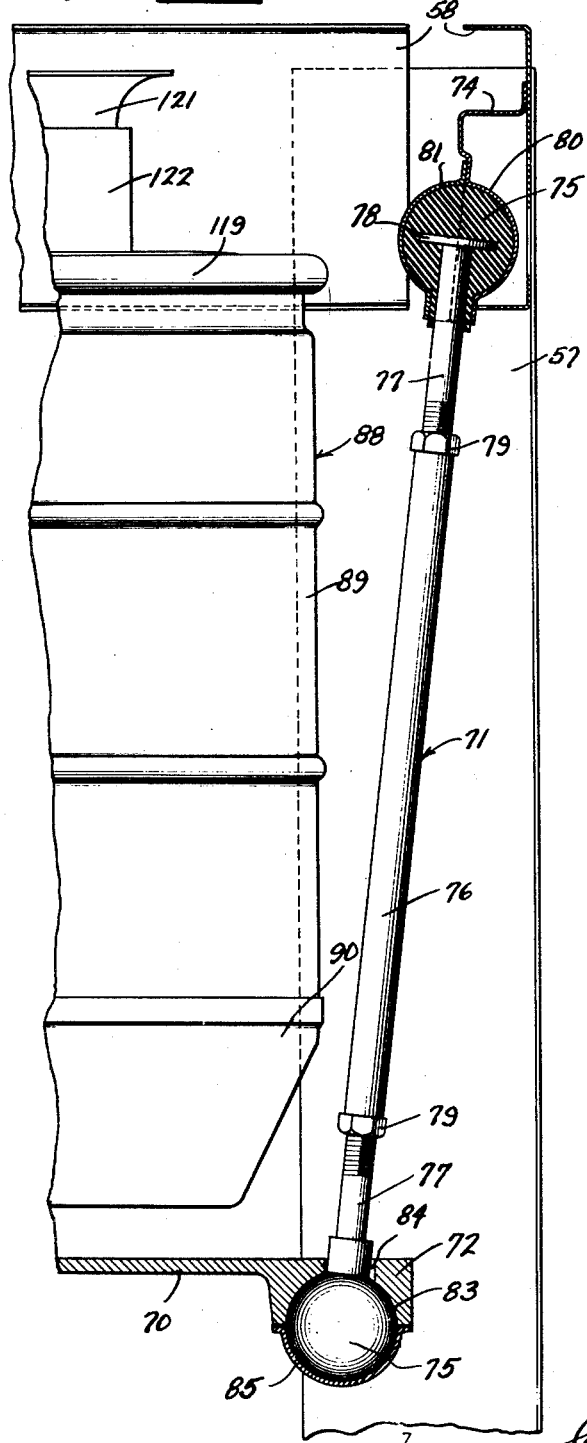
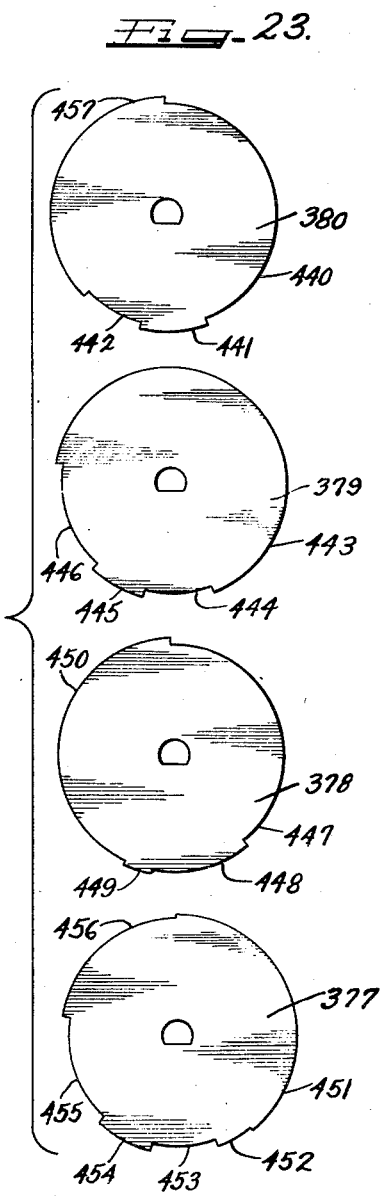
Inventors
PETER EDUARD GELDHOF.
LUTHER RINGER.
by Charles W. Hills Attys

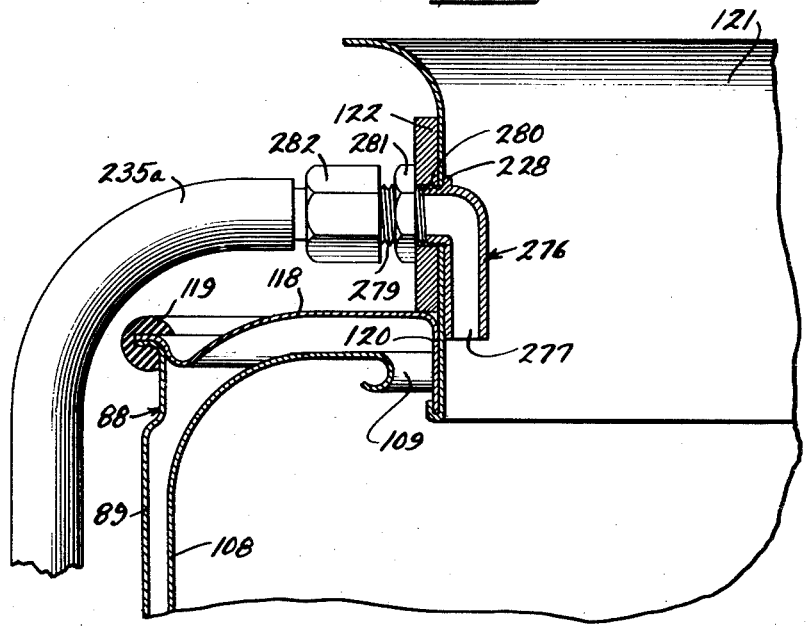
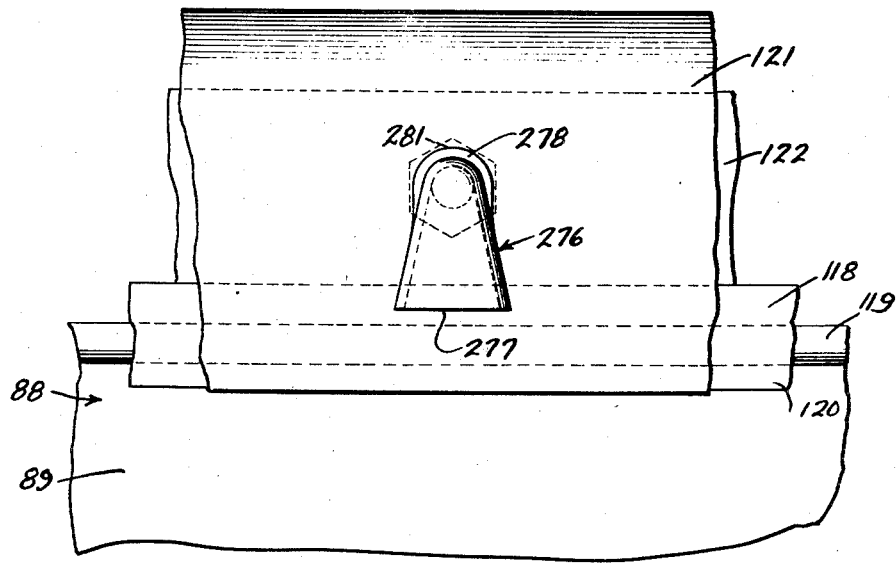

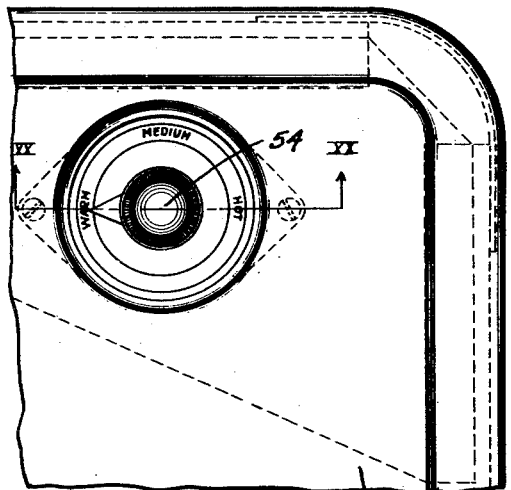
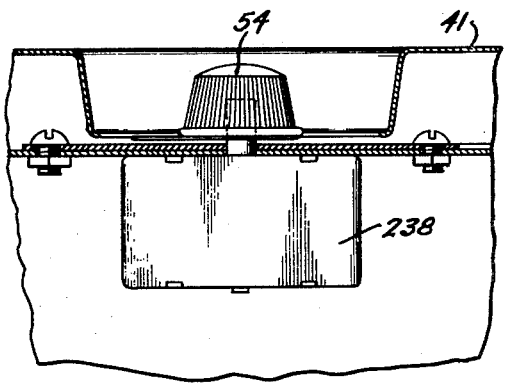
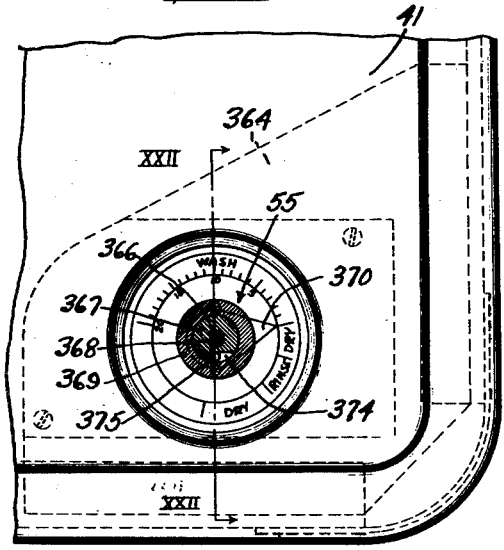
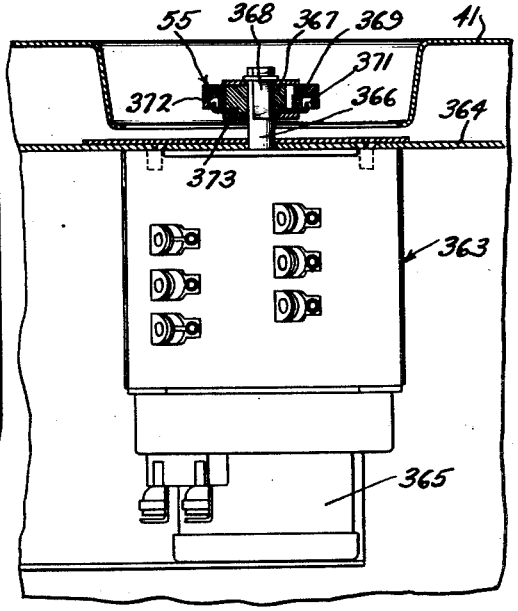

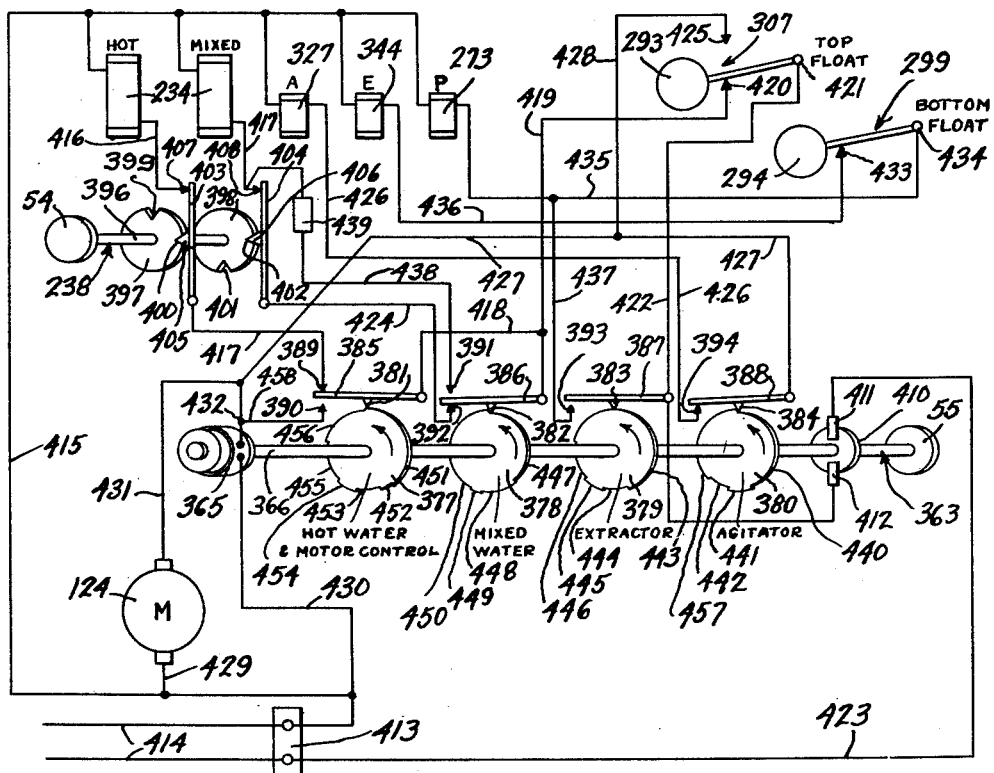

Patented Sept. 5, 1950

2,521,159

UNITED STATES PATENT OFFICE 2,521,159

AUTOMATIC WASHING, RINSING, AND DRYING MACHINE

Peter Eduard Geldhof and Luther Ringer, St. Joseph, Mich., assignors to Nineteen Hundred Corporation, St. Joseph, Mich., a corporation of New York Application June 21, 1943, Serial No. 491,618

8 Claims. (Cl. 68—12)

This invention relates to an automatic washing, rinsing and drying machine. More particularly, the instant invention is concerned with a domestic or household machine which is completely automatic in its operation in the washing, rinsing and drying of clothing or other articles to be cleansed.

It is the purpose of such apparatus as that to which the present invention pertains to reduce the burdensomeness of laundering or cleaning processes and to obviate the necessity of constant attention on the part of the operator to the apparatus in the course of its operation. The novel machine is entirely automatic to the extent that the operator is enabled to set the controls therefor to instigate the washing operation, leave the same, and return at any later period with the clothing or other articles to be cleansed completely washed, rinsed and dried.

It is an object of the present invention to provide an automatic washing, rinsing and drying machine having the above highly desirable characteristics.

It is another object of the present invention to provide a novel automatic washing machine which is economical to manufacture, simple to operate, substantially free from noise and vibration, and yet rugged and reliable in use.

Another object of the present invention is to provide a novel method of and means for electrically controlling certain of the operations comprising the sequence performed by the automatic washing, rinsing and drying machine.

The present invention also contemplates as a further object a novel form of fluid responsive control mechanism for controlling the fluid level in the apparatus as well as starting and stopping certain of the operations associated with the fluid level which are to be performed by the automatic washing, rinsing and drying machine.

Still other objects and advantages will become apparent from the following description of two embodiments of the present invention illustrated in the accompanying drawings, in which:

Figure 1 is an isometric view of the washing machine cabinet;

Figure 2 is an elevation of the washing machine with parts of the cabinet removed to illustrate the operating relationship of the several parts of the apparatus;

Figure 3 is a horizontal section through the machine substantially along the line III—III of Figure 2 and looking downwardly;

Figure 6:
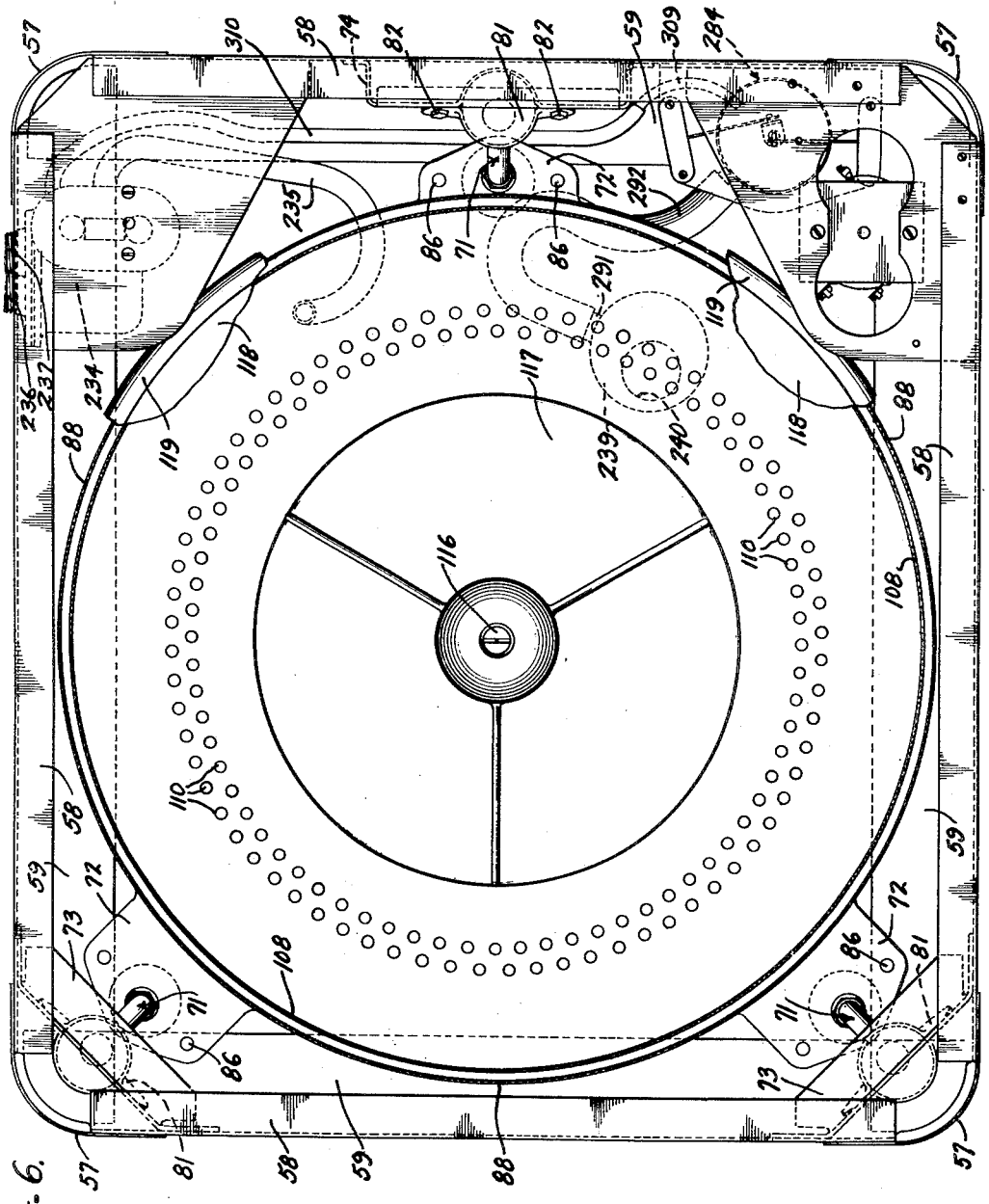

Figures 4 and 5 together form a vertical section through the machine of Figure 2, Figure 4 being the upper portion of the machine with parts broken away, and Figure 5 being the lower portion of the machine, with parts in elevation and broken away;

Figure 6 is a plan view with the top of the cabinet removed and part of the tub broken away to assist in demonstrating the orientation of the several parts of the apparatus, and to illustrate the mounting for the tub;

Figure 7 is an elevation of the pump unit and the control means therefor employed in the removal of the fluid from the tub;

Figure 8 is a substantially vertical cross-section through the pump unit of Figure 7 to illustrate the control mechanism therefor in greater detail;

Figure 9 represents a partial elevation of the control mechanism for the pump unit;

Figure 10 is a plan view with parts omitted for the sake of clearness as seen from the line X—X in Figure 8;

Figure 11 is a plan view of the fluid responsive control mechanism associated with the washing machine for controlling the fluid level in the tub and other associated operations;

Figure 12 is a vertical section through the fluid responsive control mechanism of Figure 11 as seen from the line XII—XII therein with parts in elevation;

Figure 13 is a partial vertical section of the lower end of the fluid responsive control mechanism of Figure 11 to show the association of the base of the tub and the connection for the control mechanism;

Figure 14 is a partial elevation with parts broken away of the supporting member by means of which the tub and associated operating mechanism of the washing machine is flexibly supported from the cabinet;

Figure 15 is a fragmentary sectional view at an enlarged scale showing the upper end of the tub, the extractor and the collar member associated therewith in disassembled relation;

Figure 16 is a partial vertical section taken through the cover of the washing machine cabinet to show the lid construction;

Figure 17 is a partial sectional view illustrating another embodiment of means for supplying the cleansing fluid to the apparatus at the uper end thereof;

Figure 18 is a partial elevation of a portion of the interior of the washing machine to show the outlet end of the fluid supply means of Figure 17;

Figure 19 represents an enlarged fragmentary plan view of a corner of the cover of the washing machine cabinet showing the control knob for regulating the automatic temperature controlled mixing valve for supplying fluid at the proper temperature to the washing machine.

Figure 20 is a vertical section as seen from the line XX—XX in Figure 19 to show the mounting for the fluid temperature control means;

Figure 21 is an enlarged fragmentary plan view of a corner of the cover of the washing machine cabinet showing the timer control knob with a part broken away to show the construction thereof;

Figure 22 is a vertical section substantially along the line XXII—XXII in Figure 21 with parts in elevation;

Figure 23 is a view of the several cam disks for the timer mechanism in disassembled relation in their respective angular positions relative to each other;

Figure 24 is a diagrammatic view of the electrical control circuit for the washing machine; and Figure 25 is a chart illustrating the beginning and end of each cycle of operation of the several component parts of the automatic washing machine.

Figures 1 to 16 and 19 to 25, inclusive, of the drawings, illustrate one embodiment of the present invention. The external appearance of the automatic washing, rinsing and drying machine hereinafter referred to simply as a "washing machine" is shown in Figure 1. The apparatus as illustrated includes, in general, a cabinet 40 which houses the entire mechanism and control system therefor. The cabinet 40 comprises a cover 41, a front panel 42, side panels 43, and a rear panel 44 (see Figure 3).

The cover 41 is provided with a hinged lid 45 to form the closure member for an opening 46 in said cover 41 through which the clothes or other articles to be cleansed may be introduced to the machine. The lid 45 is so disposed with respect to the opening 46 that it will be flush with the surface of the cover 41 when it is in its closed position. One or more metal straps 47 pivotally disposed in the mountings 48 secured to the under side of the cover 41 serve to provide a hinged mounting for the lid 45 with respect to the cover 41.

A depression 49 formed in the surface of the cover 41 provides access to a hand grip 50 affixed to one edge of the lid 45 opposite its hinged mounting. When the lid 45 is raised, the metal straps 47, by virtue of their arcuate form, will hold the lid 45 in tilted relation to the cover 41 as said metal straps 47 contact the rolled bead 51 of the opening 46. A cushion member or bumper 52 disposed in a socket 53 in the under side of the lid 45 and adjacent to the hand grip 50 thereon, may advantageously be provided to support the lid 45 against the base of the depression 49 formed in the cover 41 when the lid is in closed position.

In the rear right-hand corner of the cover 41 is disposed a control knob 54 which provides a means for manually operating the automatic temperature control mixing valve. This mixing valve, which will be described in greater detail hereinafter, serves to provide for the introduction of cleaning fluid, in this case, water, at the proper temperature to insure proper cleansing of the article to be laundered. In the front right-hand corner of the cover 41 is the main control knob 55 for the automatic timer. The length of the washing cycle may be predetermined and set within certain limits by the manual adjustment of the control knob 55 in a manner to be described in detail hereinafter.

It will be noted that both the knob 54 and the knob 55 are shown as being depressed below the surface of the cover 41 so that they provide no obstruction to the operator in the introduction of the articles to be laundered to the machine, or their removal therefrom.

The construction of the frame structure of the cabinet 40 will be best understood by reference to Figures 2 to 6, inclusive, of the drawings. The principal frame structure embodies four corner posts 57 to each of which is secured an end of the upper channel members 58 and the lower angle members 59. The channels 58 and angles 59 may be secured in any suitable fashion to the vertical posts 57 but are most advantageously welded to said posts 57.

A portion of the ends of the vertically extending legs of the angles 59 and a portion of the horizontally disposed legs thereof are cut away to form the substantially arcuate segments 60 at the ends of said angles 59 associated with the front panel 42 and rear panel 44 of the cabinet 40 which are disposed in overlapping relation to similarly formed segments 61 of the angles 59 which are associated with the side panels 43, as will be readily apparent from Figure 3 of the drawings. Each pair of overlapping segments 60 and 61 are apertured to receive the bolt 62 forming part of the foot 63 which is secured to the angles 59 as by means of the nut 64.

The uppermost edge of each of the panels 42, 43 and 44 is advantageously bent so as to fit over the uppermost flange of the channels 58 to assist in mounting the panels upon the frame. On the under side of the horizontally disposed leg of the angles 59 of the frame structure are secured the angle members 65 as will be seen in Figures 2 and 5 of the drawings. The lowermost edges of each of the several panels 42, 43 and 44 may be demountably attached to the angle members 65 as by means of any of several suitable forms of attaching means.

The cover 41 is provided with a downwardly extending flange portion 66 (see Figure 4) which will readily provide a snug fit between the cover 41 and the panels 42, 43 or 44, as the case may be. The cover 41 may be secured to the frame in any suitable fashion, but is provided on the under side thereof with a pair of locating means which take the form of bent strips 67 secured to the under side of the cover 41 and adapted to register with a plurality of blocks 68 of some suitable resilient material so as to render the fit of the cover 41, with respect to the remainder of the cabinet 40, tight and free from vibration.

The floating base

It will be apparent from Figures 2 and 6 of the drawings that substantially all of the operating and control mechanism of the automatic washing machine is supported within the cabinet 40 in substantially floating relation as claimed in a divisonal application, Serial No. 772,630, filed September 8, 1947, and entitled "Centrifugal Washing and Drying Machine With Means for Reducing Vibrations." This mounting is effected by providing a substantially horizontally disposed casting or spider 70 which is suspended from the frame structure of the cabinet 40 as by means of a plurality of suspension members 71. As will best be understood from Figure 6 of the drawings, the spider 70 is provided with a plurality of projecting lugs 72 to which the lower ends of the suspension members 71 are secured.

Three such lugs 72 and a corresponding number of suspension members 71 are shown as being provided, two of said suspension members 71 being disposed at corners of the cabinet 40 while the third suspension member 71 is positioned midway of the ends of the opposite wall of said cabinet 40. A pair of angle members 73 disposed diagonally of the adjacent corners of the cabinet 40 and secured to the web portion of the channels 58 provide means to which the upper ends of the two suspension members 71 disposed at adjacent corners of the cabinet 40, may be secured. A mounting means 74 is shown as being attached to the web of the channel member 58 at the right-hand side of the frame, as illustrated in Figure 6, to provide a means to which the upper end of the third of the suspension members 71 may be secured.

Each suspension member 71, which is shown in greater detail in Figure 14 of the drawings, comprises a pair of substantially spherical molded cushioning pads 75 one of which is secured to each end of rod portion 76 as by means of the threaded studs 77. The studs 77 are provided with flat heads 78 which may advantageously be molded into the cushioning pads 75 formed of rubber or other resilient moldable material. The threaded ends of the studs 77 are adapted to be threaded into the internal bore of the rod portion 76 to provide endwise adjustment of the suspension members 71, lock nuts 79 being provided to retain said studs 77 in their properly adjusted endwise relationship to the rod portion 76.

The mounting means 74 is provided with a substantially hemispherically shaped socket 80 in the face thereof to receive the substantially spherically shaped cushioning pads 75 of the suspension members 71. A cap member 81 of a shape corresponding to that of the socket 80 is secured to the face of the suspension means 74 by the bolts 82 and cooperates with said socket 80 to completely enclose the cushioning pads 75. A similar substantially hemispherically shaped socket 83 is formed in the under side of the lugs 72 of the spider 70, and having at the base thereof an aperture 84 through which the studs 77 associated with the lowermost cushioning pad 75 may extend. A cap 85 cooperates with the socket 83 in the lugs 72 to completely enclose the cushioning pads 75 and is secured to said lugs 72 as by means of the bolts 86 (see Fig. 6). A substantially identical construction to that just described is associated with each of the remaining suspension members 71 thereby providing a free and flexible mounting for the spider 70, thus insuring virtually complete elimination of vibration in the cabinet 40.

*The tub, drying basket and agitator*

Mounted on the upper side of the spider 70 is the tub 88 which comprises a substantially cylindrical wall 89 and a base portion 90, secured to spider 70 as by means of the bolts 91 and being centrally apertured to permit the generally cylindrical boss portion 92 of said spider 70 to pass therethrough. An annular shoulder 93 encircling the base of the cylindrical boss 92 cooperates with the gasket 94 and ring 95 secured to said shoulder 93 as by bolts 96 to prevent leakage of the cleansing fluid from the aperture in the base 90 of the tub 88 which accommodates the boss 92. The boss 92 of spider 70 is provided with a bore 97 in which is suitably secured a vertically extending generally cylindrical center post 98.

The center post 98 is provided adjacent its uppermost end with a sleeve bearing 99 which is press fitted into the counterbore 100 of internal bore of said center post 98. A hollow shaft 101 is journaled at its uppermost end in the sleeve bearing 99 for rotation in concentric relation to the axis of the center post 98. Disposed about the hollow shaft 101 and adjacent its uppermost end is a collar 102 which may be press fitted or otherwise suitably secured to said hollow shaft 101. The collar 102 is provided with a lower tapered portion 103 which serves as a mounting for the supporting member 104 in the upper end of which is inserted a sleeve 105 the internal contour of which corresponds to the tapered portion 103 of said collar 102.

A retaining ring 106 is threaded onto the upper end of the collar 102 and is provided with a tapered portion 107 at its lowermost end which engages the upper end of the sleeve 105 so as to force it against the tapered portion 103 of said collar 102. The lower end of supporting member 104 is flared outwardly so as to encircle the uppermost end of the boss 92 of spider 70. The supporting member 104 serves as a mounting for the perforated extractor basket 108 which is secured thereto in any suitable fashion adjacent the flared end thereof.

The basket 108 is provided with an opening 109 in the uppermost end thereof and a plurality of perforations 110 in the generally cylindrical wall and the base thereof disposed in suitably spaced relation as shown, in part, in Figure 4 of the drawings. A plate 111 of substantially disk-like shape is secured to the lowermost end of the supporting member 104 and extends substantially radially therefrom to contact the base of the basket 108 and to serve as a stiffening means therefor.

A sleeve bearing 112 is disposed internally of and adjacent the uppermost end of the hollow shaft 101, said bearing 112 providing a journal for the vertical shaft 113 which extends through the bore 114 of the hollow shaft 101 for rotation in concentric relation to the axis of said hollow shaft 101 and the center post 98. The end of shaft 113 which projects beyond the upper end of hollow shaft 101 has a tapered and squared portion 115 on which is secured, as by means of the bolt 116, an agitator 117 of the multiple vane type.

An annular rim 118, which provides a safeguard against the possibility of the operator inadvertently inserting his hand between the upper end of the basket 108 and the tub 88 when the apparatus is operating and also prevents the escape of the cleansing fluid from the tub 88 in the course of the operation of the machine, is demountably secured to the upper end of the tub 88 as by means of the flexible retaining ring 119. The retaining ring 119 renders it possible to remove said annular rim 118 if for any reason it should be necessary to have access to the basket 108 or for the removal of the same from the tub 88. The annular rim 118 is provided with a depending portion 120 which is bent downwardly so as to extend within the opening 109 in the upper end of the basket 108.

A substantially funnel-shaped annular member 121 is secured in any suitable fashion to the depending portion 120 of the annular rim 118 and extends upwardly therefrom to a point adjacent the cover 41 of the cabinet 40 so as to aid in the introduction to the machine of the clothing or other articles to be laundered as they are passed through the lid 45 of said cover 41. A weighted collar 122 which is advantageously disposed about the external periphery of the member 121 is provided to supply added weight to the assembly of operating elements mounted upon the upper side of spider 70 which will tend to reduce the extent of the swinging movement of the freely supported spider 70. The association of the several parts just described will be more readily understood from Figure 15 of the drawings, which illustrates these parts in disassembled relation.

The driving mechanism

Turning our attention now to Figures 2 and 3 of the drawings, it will be apparent that the driving mechanism for actuating the agitator 117 and the basket 108 is suspended from and mounted on the under side of the spider 70. Power is derived from an electric motor 124 which is secured to a bracket 125 by means of the bolts 126, said brackets being suspended from the spider 70 as by means of the bolts 127. The motor 124, in the illustrated embodiment of the invention, is of the vertical type and so disposed that its shaft 128 extends through the bracket 125 so as to accommodate the pulley 129. The pulley 129 of the motor 124 is adapted to drive a pulley 130 which actuates the transmission unit 131, the pulley 132 for driving the hollow shaft 101 upon which the basket 108 is supported, and the pulley 133 which operates the pump unit 134, all of said pulleys being connected by an endless belt 135.

A drive mechanism containing many features in common with the drive mechanism of the present application is shown and described in the application, Serial No. 787,060, filed November 20, 1947, and entitled "Laundering Machine." Our later filed application is a continuation-in-part of our present application, and relates in particular to the support structure for the tub and basket and to the drive mechanism for the basket, as well as to the control for said drive mechanism and for the operating cycles of the machine.

The transmission 131, which is illustrated in greater detail in Figures 4 and 5 of the drawings, is supported from the under side of the spider 70 by means of the suspension members 137 which are secured to the bosses 138 on said spider 70 as by means of bolts extending therethrough. The operating mechanism of the transmission unit 131 is enclosed in a casing comprising upper and lower members 139 and 140, respectively, held together by the bolts 141. The pulley 130 for driving the transmission unit 131 is mounted upon a vertical shaft 142 which extends through the boss 143 projecting from the upper casting 139 of the transmission case and is journaled adjacent its upper end in a sleeve bearing 144 which is press fitted into the bore 145 of the boss 143. The lowermost end of the shaft 142 is supported and journaled in the boss 146 formed in the wall of the lower casting 140 of the transmission case. A compression spring 147 which surrounds the shaft 142 and abuts the lower end of the sleeve bearing 144 serves to force the washer 148 against a snap-ring 149 which is positioned on the shaft 142 in an annular groove cut therein so as to maintain said shaft 142 in its proper axial disposition.

A plurality of gear teeth 151 may advantageously be cut on the periphery of the shaft 142 to engage a spur gear 152 which is rotatably mounted upon a stub shaft 153 and maintained in proper endwise relation with respect thereto by means of the snap ring 154 which is adapted to engage an annular groove formed on said stub shaft 153. The spur gear 152, through the link or crank arm 155, operates a gear sector 156 which is meshed with a gear 157 rotatably mounted upon the shaft 113 to which the agitator 117 is attached. While the crank arm 155 may be connected to the gear 152 and the gear sector 156 in any suitable fashion, it is advantageously mounted in pivotal relation to a boss portion 158 formed on the web of the gear 152 by means of the bolt 159 which is threaded therein, and at its other end upon the boss portion 160 formed upon the gear sector 156 being pivotally secured thereto by the bolt 161. The gear sector 156 is secured to a vertically extending pin 162 which is adapted to oscillate about its longitudinal axis as the gear sector 156 is operated by the crank 155, due to the eccentric mounting thereof upon the spur gear 152.

As will best be seen in Figure 5 of the drawings, the gear 157 is disposed in axially slidable relation with respect to the vertical shaft 113. The lower hub portion 163 of gear 157 is provided with a plurality of slots 164 extending substantially axially thereof and tapered slightly to fit over the end of a pin 165 which is mounted in shaft 113 so as to extend radially therefrom. The gear 157 is movable axially of the shaft 113 in the manner illustrated in Figure 5 of the drawings in which a fork 166 which registers with an annular groove 167 cut into the upper hub portion 168 of the gear 157 so as to engage or disengage one of the slots 164 in the lower hub portion 163 of said gear 157 with the radially disposed pin 165 on the shaft 113. The fork 166 is secured to a vertically extending rod 169 which is adapted to slide endwise in the bore 170 of the internal boss 171 formed in the lower casting 140 of the transmission case, and a sleeve 172 mounted in the upper casting 139 of said transmission case. The rod 169 is advantageously raised and lowered by a control mechanism which will be described in detail hereinafter.

The shaft 113, which, as previously described, is journaled within the bore 114 of the hollow shaft 101, is concentrically disposed within the center post 98 and extends downwardly within the bore 97 of the boss 92 through the spider 70 and into the transmission unit 131. The lower end of the shaft 113 is journaled in the bore 173 of a boss 174 depending from the lower casting 140. A steel ball 175 which is disposed in the inverted conically shaped base 176 of the bore 173 of said boss 174 serves as a thrust bearing thereby supporting the shaft 113 in proper endwise relation.

On the under side of the top casting 139 of the case enclosing the transmission unit 131 and encircling the shaft 113 adjacent the point where it extends through said top casting 139 is a packing unit comprising an inverted cup-shaped holder 177 for retaining the packing 178 which serves to prevent the entrance of dirt, dust or other substances into the transmission case in which the several parts are immersed in a lubricating medium as well as to prevent leakage of the lubricating medium from the case. The packing 178 is retained in the cup-shaped holder 177 as by means of a disk member 179 held in place by a compressed spring 180 urged there-against by a washer 181 disposed endwise of the shaft 113 by means of the pin 182 therein.

A collar 184 is secured to the shaft 113 at a point just above that at which said shaft 113 extends through the top casting 139 of the case enclosing the transmission unit 131, as by means of the set screw 185, said collar being provided with a depending skirt portion 186 which extends downwardly over the opening in top casting 139 through which shaft 113 passes (see Figure 5). The collar 184 acts as a means of supporting the hollow shaft 101 by virtue of the fact that the sleeve bearing 187 fits into the hollow shaft 101 at its lowermost end and is provided with an annular flanged portion 188 which contacts the upper face of the collar 184. A pulley 132, which, as previously explained, is driven from the motor 124 by means of the endless belt 135, is rotatably mounted about the external periphery of said hollow shaft 101 as by means of the bushing 189 which is press fit into said pulley 132. The pulley 132 is retained in endwise relation to said shaft 101 by means of a snap ring 190 and washer 191 which is riveted or otherwise suitably secured to the lower end of shaft 101 and contacts the upper face of the flanged portion 188 of the sleeve bearing 187.

Mounted upon the hollow shaft 101 at a point just below that at which it passes through the spider 70 (Figure 4), are a sleeve member 192 and an annular member 193 extending about the outer periphery of the sleeve 192, both of said members being secured to the hollow shaft 101 as by means of the setscrew 194 which is threaded into the radially extending hole 195 in said annular member 193 so as to register with the depression 196 in the outer wall of the hollow shaft 101. A friction clutch is provided to drive the sleeve 101 and basket 108 from the pulley 132 and a brake is provided to hold the basket 108 from rotation when the clutch is disengaged, as is clearly shown and described in our divisional application, Serial No. 765,200, filed July 31, 1947, and entitled "Control and Drive Mechanism for Automatic Washing, Rinsing and Drying Machine" so need not herein be described in detail except to point out that they include a flanged member 198 splined on the sleeve 192. An annular friction member 200 is secured to the bottom of the flanged portion of the flanged member 198 for engagement with an annular top surface of the pulley 132, to effect driving of a hollow shaft 101 from said pulley.

An annular braking disk 228 encircles the shank of the flanged member 198 and is suitably trunnioned to opposite walls 214 of a clutch shifting member 213. Upon disengagement of the clutch, the braking disk 228 is engaged with the bottom surface of a friction disk 206 splined on the shank of the flanged member 198 and yieldably urged toward the braking disk 228. Engagement of the clutch is effected by upward rocking movement of the member 213 about a pivotal pin 218 extending transversely through a vertical rod 215, and having the member 213 resting thereon. The end of the member 213 opposite from the rod 215 rests on a transverse pin 227 extending through a vertically movable rod 222, which serves to disengage the clutch and move the disk 228 into engagement with the annular friction ring 206, and stop rotation of the hollow shaft 101 upon upward movement of said rod.

*Tub filling and draining mechanism*

Attention is now directed to the apparatus for filling and draining the tub 88 of the automatic washing machine which will be seen to best advantage in Figures 2, 3, 6, 7 to 10, inclusive, 17 and 18.

The cleansing fluid, in this case, water, is supplied to the tub 88 under ordinary city main pressure through a temperature control mixing valve 234 and a flexible hose 235 which as will be seen from Figure 6 is connected to an opening in the base 90 of the tub 88. It will be understood that the temperature mixing valve 234 is adapted to receive hot and cold water through intakes 236 and 237, respectively, and to automatically control the relative amount of each so that water of the desired temperature passes through the flexible hose 235 and into the tub 88. The temperature mixing valve will not be shown and described in detail for the reason that any conventional type of valve may be employed. Any one of three desired temperatures of water may be employed in the apparatus ranging from warm to hot depending upon the setting by the operator of the control knob 54 mounted on the cover 41 which actuates the control means 238 (see Figures 19 and 20) for controlling the proper setting of the mixing valve 234.

The base 90 of tub 88 is provided with a sump 239 having a connection 240 to which the pump unit 134 is connected by means of a flexible hose connection 241 for withdrawing the water from the tub 88. The pump unit 134 may take any suitable form such, for example, as the centrifugal type pump illustrated in Figures 8 and 9 of the drawings. A bracket 242 to which the pump 134 is secured as by means of a plurality of bolts 243 is suspended from a pair of bosses 244 formed on the under side of the spider 70 and secured thereto by the bolts 245. The inlet connection of pump 134 designated by reference character 246 is connected with the sump 239 by the flexible hose 241. The water from the tub 88 passes through the inlet connection 246 into the chamber 247 to be discharged from outlet 248 by the action of the impeller 250, the outlet 248 being provided with a flexible hose connection 251 for carrying the discharged water to a suitable drain or house catch basin (not shown).

The pump unit 134 is adapted to be actuated by the pulley 133 driven from the motor 124 by means of the belt 135. An automatic disconnecting means is adapted to direct the operation of the pump 134. The pump 134 will, of course, be halted during those stages of the operation of the automatic washing machine when it is desired to retain the water in the tub 88. In the pump unit 134, as illustrated in Figure 8 of the drawings, a vertical shaft 252 is journaled in upper and lower sleeves 253 which are press fitted into the bore of a vertically extending boss 254 forming part of the pump casting 255. The impeller 250 is secured in any suitable fashion to the lowermost end of the shaft 252 while the pulley 133 is freely rotatably mounted about said shaft 252 at a point adjacent its uppermost end. A bushing 256 serves as the hub member by which the pulley 133 is mounted about a sleeve member 257 provided with an annular flanged portion 258 at the lowermost end thereof for supporting said pulley 133 in proper axial relation to the shaft 252.

Adjacent the uppermost end of the shaft 252 is disposed a collar 259 having a set screw 260 which serves to secure both the collar 259 and the sleeve 257 to the shaft 252. About the external periphery of the collar 259 and extending downwardly so as to encircle the shank portion 261 of the pulley 133 is a helical spring 262 which is disposed between a groove 263 in the collar 259 and a shoulder 264 at the base of the shank portion 261 of the pulley 133. The end of the spring 262 adjacent the shoulder 264 is provided with a bent-up or hook portion 265 which extends substantially radially with respect to the axis of the vertical shaft 252. The hook portion 265 is adapted to contact a vertically extending lever arm 266 which is secured in any suitable fashion about the horizontal rod 267 which is adapted to be pivoted about the axis of its mounting in the ears 268 formed on the bracket 242. An arm 270 secured to the horizontally disposed rod 267 and adapted to extend through an opening 271 in the bracket 242 is connected by a pin 274 to the plunger 272 of a solenoid 273 which is mounted upon the bracket 242 as by means of the bolts 275.

As will best be understood from Figure 9 of the drawings, the lever arm 266 is adapted to be contacted with the hook portion 265 of the spring 262 during that interval of the operation of the apparatus when it is desired that the pump should not be operated. Contact between the lever arm 266 and the hook portion 265 will permit the pulley 133 to be rotated about the sleeve member 257 thus preventing the shaft 252 from being actuated. The solenoid 273 is provided with suitable electrical connections (not shown) which are connected into the main control circuit for the automatic washing machine so as to cause said solenoid 273 to be energized when, in accordance with that part of the cycle of operations being performed by the automatic washing machine, the water is to be removed from the tub 88.

When the solenoid 273 is energized, the plunger 272 thereof, which normally occupies the position shown in solid lines in Figure 9, is caused to be raised thereby lifting the end of the arm 270 attached thereto which rotates the rod 267 about its horizontal axis so as to tilt the lever arm 266 out of contact with the hook portion 265 in such fashion that the several parts will thereafter occupy the positions indicated in dotted lines. In the course of this operation, as the hook portion 265 is disengaged from the lever arm 266, the spring 262 will be caused to tighten about the shank portion 261 of the pulley 133 so as to effectively lock together the collar 259 and the pulley 133 whereby the shaft 252 will be rotated and the impeller 250 of the pump unit 134 will be actuated causing the water to be withdrawn from the tub 88. It will be understood that upon the completion of the pumping operation and under the influence of an appropriate control circuit of the type hereinafter described in detail, the several parts of the apparatus will be returned to their original positions.

By reason of local restrictions which prohibit the use of any apparatus in which water is to be stored for cleansing or other operations being connected to the water supply system, it may be preferable to provide an alternate method and means for introducing cleansing fluid into the automatic washing machine of the present invention. To this end, the means illustrated in Figures 17 and 18 of the drawings including a nozzle 276 mounted upon the inner periphery of the annular member 121 and disposed adjacent to the cover 41 of the apparatus may advantageously be employed. The nozzle 276 is provided with a flared outlet end 277 the back wall of which co-operates with a substantially semi-circular vertically disposed flange portion 278 to position the nozzle 276 so that its threaded portion 279 will extend through an aperture 280 in the annular member 121 and the associated weighted ring 122. A lock nut 281 is threaded onto the portion 279 of the nozzle 276 so as to mount said nozzle 276 in fixed position on the interior of the annular member 121. A female connection 282 which is adapted to be secured to the threaded portion 279 of the nozzle 276 provides a means for connecting thereto a flexible hose connection 235a which in this embodiment takes the place of the flexible hose connection 235 previously explained as being connected to the base of the tub 88. The flexible hose connection 235a is connected to the the outlet side of the mixing valve 235 so that as the water is supplied thereby it is introduced at the upper end of the tub 88 through the nozzle 276.

Float switch mechanism

Attention is now directed to Figures 11 to 13, inclusive, of the drawings in which is illustrated one form of mechanism which may advantageously be employed to indicate and electrically control the amount of water contained in the tub 88 of the automatic washing machine of the present invention. The mechanism in question is shown as being disposed internally of the cabinet 40 and in the front right-hand corner of the cabinet 40 adjacent to but below the point at which the timer knob 55 is mounted in the cover 41.

The water level control mechanism indicated generally by the reference character 284 includes a vertically extending generally cylindrical member 285 which has an opening 286 at its uppermost end and is provided with a closure member 287 secured internally thereof at its lowermost end. The cylindrical member 285 is supported as by means of the brackets 288 and bolts 289 to one of the corner posts 57. A connection 290 extending through the wall of the cylindrical member 285 is provided adjacent the closure member 287 at the base of said cylindrical member 285 for connection with a similar connecting means 291 in the vertical wall of the sump 239 formed in the base 90 of the tub 88 as by means of a flexible hose 292 (see Figure 6).

Disposed within and adapted to move in a direction parallel to the vertical axis of the cylindrical member 285 is a pair of float members which may, for the purposes of illustration, take the form of diving bells 293 and 294. The lowermost diving bell 294 is provided with a centrally disposed boss portion 295 in the dome thereof to which is secured a vertical rod 296. The rod 296 is provided at its uppermost end with a hook portion 297 extending through an aperture in the lever arm 298 of a toggle switch 299 mounted as by means of the bolts 300 upon the upper bracket 288.

The upermost diving bell 293 is provided with a centrally disposed boss portion 302 in the internal bore of which is press fitted or otherwise suitably secured a tubular member 303 which may advantageously extend both above and below the upper and lower extremities of the diving bell 293 in order to serve as a guide means for the diving bell 293 by virtue of its disposition about the rod 296 associated with the lowermost diving bell 294. A connecting means 304 is secured in any suitable fashion to the uppermost end of the boss portion 302 of the upper diving bell 293 and has a hook portion 305 which is adapted to be connected to the arm 306 of a toggle switch 307 mounted as by means of the bolts 308 upon the uppermost bracket 288.

By virtue of the construction just described for the water level control mechanism 284, the upper diving bell 293 and the lower diving bell 294 are free to move independently of each other within the interior of the cylindrical member 285 under the influence of the water admitted to said cylindrical member 285 from the tub 88 of the automatic washing machine. By virtue of the fact that the cylindrical member 285 is connected directly with the tub 88, the cleansing fluid which normally contains a detergent forming suds, scum and the like therein is admitted directly to said cylindrical member 285, and it may be advantageous to employ means for occasionally flushing out the interior of said cylindrical member 285 to prevent the continual accumulation of such deposits therein as the cleansing fluid is drained therefrom. To this end, a small pipe 309 supported by the uppermost bracket 288 and extending downwardly into the opening 286 at the upper end of the cylindrical member 285 may be provided. The pipe 309 is connected as by means of the flexible tubing 310 to a suitable connection provided upon the mixing valve 234 which supplies a small amount of fresh water to the cylindrical member 285 of the water level control mechanism 284 as the mixing valve 234 is operated.

It will be readily understood that suitable electrical connections (not shown) will be provided for connecting the toggle switches 299 and 307 into the electrical control circuit of the automatic washing machine in order that the switches when actuated by the diving bells 293 and 294 may operate to control the maximum level of the fluid in the tub 88, the starting or stopping of the agitator drive mechanism actuating the agitator 117, controlling the operation of the extractor drive mechanism for the basket 108 and other similar operations in the course of the washing, rinsing and drying cycle, all of which are dependent upon the level of the water in the tub 88 of the automatic washing machine. The control circuit and its method of directing the operation of the several parts of the apparatus will be described in greater detail hereinafter.

As for the operation of the water level control mechanism 284, itself, it will be understood that as the water is admitted to the tub 88 from the mixing valve 234 either from the bottom or from the top of the apparatus by the means hereinbefore described, the water, by virtue of the interconnection of the cylindrical member 285 with the tub 88, will pass through the connections 290 and 291 and the hose 292 so as to rise within said cylindrical member 285 to a level corresponding to that attained in the interior of the tub 88. As the water rises in the cylindrical member 285 above the closure 287 at the base thereof, air will be entrapped within the domed interior of the lowermost diving bell 294 thereby causing the same to float and move vertically of the cylindrical member 285 when the water reaches a given level therein. In so doing, the rod 296 affixed to the diving bell 294 also moves in an axial direction thereby raising the lever arm 298 of the toggle switch 299. This operation may, or may not, set in motion certain operations dependent upon the water level in the tub 88 to perform certain functions in the operation of the apparatus depending upon the specific setting of the control circuit in a manner to be described hereinafter.

The water admitted to the tub 88 by the mixing valve 234 continues to rise within the cylindrical member 285 after having raised the lowermost diving bell 294 and serves to operate in a similar manner to raise the uppermost diving bell 293 which by virtue of the connection means 304 engaging the lever arm 306 trips the toggle switch 307. The toggle switch 307 may advantageously be connected into the control circuit of the automatic washing machine in such fashion that the mixing valve 234 may be closed to discontinue the influx of water to the tub 88, the agitator 117 may be set in motion, in addition to any one or more similar associated steps which may be performed depending upon the character of and the setting for the control circuit employed with the automatic washing machine.

It will be readily understood that the exact reverse of the several operations hereinbefore described in connection with the water level control mechanism 284 will take place when the water is drained from the tub 88 through the sump 239 as by means of the pump unit 134. The several parts of the apparatus will assume their original positions as shown, for example, in Figure 12 of the drawings.

*Control for agitator and extractor*

Attention is next directed to the control mechanism which serves to direct the operation of the agitator drive mechanism and the extractor drive mechanism at the proper intervals as determined by the sequence of steps to be performed in the operation of the automatic washing machine. This portion of the apparatus is clearly shown and described in our divisional application, Serial No. 765,200, so need only herein be described in sufficient detail to point out that the control mechanism is so arranged as to disconnect the extractor drive mechanism from the basket 108 and connect the agitator drive mechanism to drive the agitator 117 and vice-versa by means of two reciprocably driven sliding bars 318 and 335 (Figure 3).

The bar 318 is slidably guided in the vertical rod 169 and has a cam surface (not shown) engaging said rod to move said rod 169 and the pinion 157 vertically to disconnect the pinion 157 from driving engagement with the pin 165 upon movement of said bar in one direction. Upon movement of the bar 318 in an opposite direction the pinion 157 moves downwardly into driving engagement with the pin 165 to reciprocably drive the shaft 113 and agitator 117.

The bar 335 is slidably guided in the rod 222 and has a cam surface thereon (not shown) engaging said rod, to vertically move said rod in an upward direction upon slidable movement of the bar 335 in one direction and disengage the friction disk 200 from the top surface of the pulley 132. Upon movement of the bar 335 in an opposite direction the rod 22 moves downwardly along the cam surface of said bar to effect engagement of the friction member 200 with the pulley 132, and driving or spinning of the extractor 108. The bars 318 and 335 are oppositely moved by rocking movement of a mounting 312 secured to the pin 162 and oscillated thereby. Two solenoids 327 and 344 are provided to control movement of the respective bars 318 and 335 with the oscillating mounting 312 (Figure 24). The plungers (not shown) of the solenoids 327 and 344 are slidably connected with the respective bars 318 and 335 in a manner clearly shown in our divisional application, so that when either solenoid is energized a respective bar will be slidably moved with the mounting 312 for the length of the stroke thereof to a position to allow the respective rod in which it is guided, to move downwardly and thereby cause driving of the respective drive member controlled thereby. When the respective solenoid is deenergized, a respective slidable bar will be moved in an opposite direction for the length of stroke of the mounting 312, to elevate the respective rod and disconnect the respective drive member controlled thereby.

*The electrical control circuit*

Attention is now directed to Figures 19 to 25, inclusive, relating to the electrical control circuit which operates to direct the various mechanical operations to be performed by the automatic washing machine which function at predetermined times and for predetermined intervals over a complete cycle of operation. For this purpose, any of several suitable types of timing devices may be employed, such for example, as the timer 363 mounted directly beneath the cover 41 of the cabinet 40 and secured to a bracket 364 which extends diagonally across the front right-hand corner of the cabinet being supported from the channel members 58. Inasmuch as the timer per se forms no part of the present invention it has not been illustrated in detail. The timer 363 illustrated herein embodies an electric motor 365 which operates a shaft 366 to which are secured a plurality of cam disks 377 to 380, inclusive.

In the conventional timing mechanism employed in connection with the apparatus of the illustrated embodiment of the present invention, the motor 365 rotates the shaft 366 in a step-by-step action at 37½ second intervals. More specifically, the construction of the timing mechanism 363 is such that the shaft 366 is rotated through an angle of 5° every 37½ seconds.

Secured to the upper end of the shaft 366 is a control knob 55 which includes a central disk 367 which is provided with a D-shaped slot therein adapted to fit over the end of the shaft 366 on which a flat portion 368 has been provided. An outer ring 369 is disposed about the central disk 367 in slidably mounted relation to the outer periphery thereof and is vertically supported upon a pointer 370 provided with upwardly projecting portions 371 which register with recesses 372 in the under side of said ring 369. The pointer 370 is disposed in proper axial relation with respect to the shaft 366 by the central disk 367 and a washer 373 which is firmly secured to the shaft 366.

As will be apparent from Figure 21, the central disk 367 has a slot 374 cut out of the periphery thereof for the purpose of providing a friction clutch arrangement. A pin 375 of a diameter which is slightly less than the maximum width of the slot 374 in which it is disposed but greater than the width of the narrowest portion of said slot operates to permit the shaft 366 to be rotated only in a clockwise direction by the knob 55 through the cooperation of the slot 374 and the pin 375 operating as a clutch. If the knob 55 is attempted to be rotated in a counterclockwise direction, the outer ring 369 rotates freely about the periphery of the central disk 367 and, therefore, does not turn the shaft 366.

As will be presently understood, this arrangement is necessary to prevent damage to the cam disks 377 to 380, inclusive as well as other parts of the apparatus associated therewith which are to be presently described. Moreover, the motor 365 of the timer 363 is adapted to rotate the shaft 366 in a clockwise direction only when viewed from the top.

As may best be seen from the wiring diagram for the control circuit shown in Figure 24 of the drawings in which the cam disks 377 to 380, inclusive, of the timer 363 are illustrated, each cam is provided with a cam follower 381 to 384, inclusive, mounted on contact arms 385 to 388, respectively. Associated with each of the contact arms 385 and 386 is a pair of stationary contact points 389, 390 and 391, 392, respectively. Contact arms 387 and 388 are provided with stationary contact points 393 and 394, respectively.

In the case of the contact arms 387 and 388, the contact arm will be in engagement with its corresponding stationary contact point whenever the respective cam follower is on a low point of the associated cam disk. Conversely, when the cam follower is upon the high point of its cam disk, the associated contact arm will be out of engagement with the stationary contact point therefor. The operation of the contact arms 385 and 386 is similar to that of the contact arms 387 and 388 with the exception that when the cam followers associated with each of these arms are on the high point of the associated cam disks the contact arms will be in engagement with their respective upper contact points 389 and 391 respectively. The contact arms 385 and 386 will, of course, engage the lower contact points 390 and 392 when their respective cam followers are on low points on their respective cam disks. It will be noted from Figure 23, however, that disks 377 and 378 are also provided with intermediate points which will maintain the contact arms 385 and 386 out of engagement with either of their contact points for certain intervals.

As illustrated in Figure 24, contact arms 385 and 387 are in their uppermost positions since the cam followers 381 and 383 therefor are on the high points 451 and 443, respectively, of their respective disks 377 and 379. Contact arm 385 will be in engagement with the contact point 389 while the arm 387 will be supported out of contact with its single contact point 393. Contact arms 386 and 388 are illustrated as being in exactly the opposite relationship to their contact points from that of contact arms 385 and 387. The follower 382 for contact arm 386 is traversing the low point 447 of the disk 378 and, therefore contact arm 386 will be in engagement with the lower contact point 392. Contemporaneously, the follower 384 of the contact arm 388 is on the low point 440 of the disk 380 and thereby permits engagement of the contact arm 388 with its contact point 394.

The shaft 366 of the timer 363 is so mounted that it may be lifted vertically a slight amount without causing disengagement of the cam followers from their associated cam disks. This slight vertical lifting of the shaft 366, however, is sufficient to permit a contact disk 410 mounted upon the shaft 366 to be raised slightly out of engagement with a pair of stationary contacts 411 and 412. Thus, an opportunity is afforded the operator to start the operation of the automatic washing machine at any given point in its ordinary cycle of operation.

The particular configuration of each of the several cam disks 377 to 380, inclusive, is clearly illustrated in Figure 23 of the drawings. The arrangement of the cam disks as shown corresponds to their respective angular positions relative to each other as illustrated in Figure 24 of the drawings. As indicated, the disk 377 is connected into that portion of the electrical circuit which controls the addition of hot water to the apparatus at the proper stage in its cycle of operation and also controls the operation of the timer motor 365. The disk 378 is disposed in the electrical circuit for controlling the addition of mixed water to the apparatus in the course of the washing or rinsing operations. The cam disk 379 is disposed in the extractor circuit and controls the operation of the drying basket 108 while the cam disk 380 is connected into that portion of the control circuit which directs the operation of the agitator.

The control unit 238 associated with timer 363 for directing the operation of the mixing valve 234, which, as we have seen, provides water of the desired temperature for introduction to the tub 88 of the automatic washing machine, is of a construction substantially similar to that of the timer 363. The control unit 238 has a knob 54 mounted on the upper end of the shaft 396 which provides a manual adjustment for the control unit so that the desired temperature of the cleansing fluid will be furnished by the mixing valve 234. Mounted upon the shaft 396 are the disks 397 and 398 each of which is provided with a pair of notches 399, 400 and 401, 402, respectively. Depending upon the manual adjustment of the shaft 396 by the use of the knob 54, the cam follower 405 associated with the contact arm 403 for the disk 397 will register with one or the other of notches 399 or 400 thereon while cam follower of contact arm 404 will engage one of the notches 401 or 402 of the disk 398. The stationary contact points 407 and 408 which are connected to the mixing valve 234 and serve to control the proportions of hot and cold water supplied thereby to produce the desired temperature for the mixture are adapted to be engaged by the contact arms 403 and 404, respectively, whenever the cam followers 405 and 406 for the contact arms, respectively, register with one of the notches 399, 400 or 401, 402, as the case may be.

As will best be seen from Figure 19 of the drawings, three different settings for the control knob 54 are provided depending upon whether hot, medium, or warm water is desired in the apparatus for the accomplishment of the cleansing operation. As will be apparent from the diagrammatic showing of the control unit 238 in Figure 24, these different settings of the control unit 238 are achieved by shifting the shaft 396 thereof so that the disks 397 and 398 are brought into a position such that the notch 399, for example, will register with the follower 405 of the contact arm 403 so as to bring the same into engagement with the stationary contact point 407 when hot water alone is desired. In this adjustment of the control unit 238 it will be seen that the follower 406 of the contact arm 404 associated with the disk 398 will not register with either of the notches 401 or 402 thereon thus causing the arm 404 to be held out of contact with its contact point 408.

For medium temperature of the water, the disks 397 and 398 will be so disposed that followers 405 and 406 for contact arms 403 and 404, respectively, will be in simultaneous registry with their respective notches 400 and 402 as indicated in Figure 24. This arrangement of the parts as will be noted brings both contact arms 403 and 404 into engagement with their respective contact points 407 and 408. If the shaft 396 is shifted to a position such that only the notch 401 of the disk 398 registers with the follower 406 for the arm 404, the arm 403 will be held out of contact with its contact point 407 and warm water only will be supplied to tub 88 by mixing valve 234 by reason of the engagement of contact arm 404 with contact point 408.

Thus it will be seen that the mixing valve 234 may be manually directed to supply water of varying temperature ranges to the tub 88 for performing the various cleansing operations depending upon the nature of the clothing or other articles to be washed or rinsed. When the control knob 54 is manually adjusted to the position indicated for hot water, it will be understood that hot water alone will be supplied to the tub 88. However, when it is desired to provide water of medium temperature both hot and cold water will be furnished to the tub 88 and lastly when warm water alone is desired the mixed water only will be supplied. The control unit 238 is only intended to provide a selective manual adjustment of the water temperatures supplied to the tub 88 of the automatic washing machine. The actual opening and closing of the valves for admitting the water at the proper time in the cycle of operation or shutting off the same is controlled by the timer unit 363 in the manner hereinafter to be described in detail.

The timer 363 is connected through a terminal block 413 to a power line 414 which supplies electrical current at the desired voltage to the main operating motor 124 of the washing machine, to the timer motor 365 and to the various electrical control circuits. In an effort to simplify the description of the control circuit as much as possible, the various wiring circuits for the several controls will be traced back from the operating solenoid, switch or other apparatus to the source of power in the order in which their functions are performed. With the cam disks in the positions shown in Figure 24, the washing machine of the present invention is ready to proceed through its complete cycle of operation.

By virtue of the manual setting of the knob 54 to the medium position on the scale of the control unit 238 (see Figure 19), the mixing valve 234 will be caused to deliver a combination of hot and mixed water to the tub 88. The mixing valve 234 is energized through the conductor 415 to one side of the power source 414. That part of the mixing valve 234 controlling the hot water supply has a branch circuit from the conductor 414 through conductor 416, contact point 407, contact arm 403, conductor 417, contact point 389, contact arm 385, conductors 418 and 419 through contacts 420 and 421 of toggle switch 307 associated with the top float or diving bell 293, conductor 422, timer switch elements 410, 411, 412 and conductor 423 to the other side of the power source. The other part of the mixing valve 234 for handling the mixed water has a branch circuit from conductors 414 and 415, through conductor 417, contact point 408, contact arm 404, conductor 424, contact point 392, contact arm 386 to conductor 419 and from there on through the same circuit as that of the previously described branch to the other side of the power source.

In view of the fact that the agitator, the timer motor, and the main washer motor are all connected in a control circuit through the top contact 425 of the toggle switch 307 for the upper diving bell 293, none of these elements are energized while the tub 88 is being filled with water at the desired temperature. By way of illustration, it will be observed from Figure 24 that even though the contact arm 388 associated with the agitator control disk 380 is closed against its contact point 394, the agitator solenoid 327 is not energized because the contact 425 of the toggle switch 307 associated with the upper diving bell 293 of the water level control unit 284 is open. It is to be noted that in order to close this circuit the contact 425 must be closed to complete the circuit which includes the conductor 415 to the solenoid 327 for operating the agitator from the one side of the power source 414, conductor 426, contact point 394, contact arm 388, conductors 427 and 428, and the aforementioned contacts 425 and 421 of the toggle switch 307 (when the same is closed), conductor 422, switch elements 410, 411, 412 and conductor 423 to the other side of the power source.

As explained in detail in the description of the water level control unit 284, the upper diving bell 293 rises in the cylindrical member 285 of unit 284 as the tub 88 and said member 285 are filled with water from the mixing valve 234 eventually closing the circuit between the conductors 428 and 422. This operation breaks the circuit through the temperature control mixing valve 234 and the entry of the water to the tub 88 ceases. With the circuit completed by the closing of the gap between the contacts 421 and 425 of the toggle switch 307, the agitator solenoid 327 is contemporaneously energized and the operation of the agitator 117 is begun. When the contacts 421 and 425 of the toggle switch 307 are closed, it will be observed that the circuit of the motor 124 as well as that of the timer motor 265 are also energized. Therefore, as soon as the motor 124 starts up the agitator 117 begins its oscillatory motion. The motor 124 and motor 365 are connected in shunt with respect to each other.

One side of each of the motors 124 and 365 is connected as by means of the conductors 429 and 430, respectively, to one side of the power source 414. It will be apparent from Figure 24 that the motor 124 and timer motor 365 are connected into the above described agitator circuit by way of the conductors 431 and 432, respectively, with the conductor 427 for completing the circuit through contacts 421 and 425 of toggle switch 307 as explained above to the other side of the power source.

The timer motor 365, however, during part of the operation of timer 363 is supplied with electrical energy by reason of the fact that cam disk 377 permits the arm 385, the follower 381 of which traverses the disk 377 to engage the lower contact point 390 when said follower 381 contacts low points 453 and 455. The circuit for timer motor 365 and motor 124, is, therefore, alternatively completed through conductors 458 and 432, contact point 390, contact arm 385, conductors 418 and 419, through toggle switch contacts 420 and 421, conductor 422, switch elements 410, 411, 412 and conductor 423 to one side of the power source 414 and with conductor 430 to the other side thereof, motor 124 being connected into conductor 432 by conductor 431 and to the power source 414 by conductors 429 and 415. This alternate circuit is necessary to energize the motors 124 and 365 when that circuit including the toggle switch 307 is deenergized by the dropping of upper diving bell 293 as the water is removed from tub 88.

Since the timer motor 365 when once started is continuously operating, except for a short interval when the rinse water is introduced to tub 88 as will be explained, the shaft 366 of timer 363 is caused to be rotated in the direction indicated by the arrows shown in Figure 24 (clockwise as viewed when looking down on the knob 55 thereof). This causes the cam disks 377 to 380, inclusive, to change their positions resulting in the contact arm 388 associated with the agitator cam disk 380, for instance, to break contact with its respective contact point 394, when cam follower 384 moves from low point 440 to high point 441 on said cam disk 380, thereby deenergizing the agitator solenoid 327 and stopping the operation of the agitator 117. Contemporaneously therewith, the cam follower 383 of contact arm 387 now reaches the end of high point 443 and starts traversing low-point 444 of the cam disk 379 and the pump solenoid 273 and the extractor solenoid 344 are now connected into the circuit by the engagement of the contact arm 387 with the contact point 393. Only the pump unit 134, however, will start to operate at this instant for the reason that the circuit through the extractor solenoid 344 is open since the circuit through toggle switch 299 associated with the lower diving bell 294 between contacts 433 and 434 is open until the water level drops within the tub 88 by the removal of the water therefrom during the operation of the pump 134.

The circuit including the pump solenoid 273 is connected as by means of the conductor 415 to one side of the power source 414 and to the other side of the power source 414 through the conductors 435 and 437, contact point 393, contact arm 387, conductor 422, switch elements 410, 411, 412 and conductor 423. When the water level within the tub 88 through the operation of the pump unit 134 is lowered to the point where the lower diving bell 294 operates the toggle switch 299 to close the contacts 433 and 434 thereof, the circuit through the extractor solenoid 344 which is directly connected by means of the conductor 415 to one side of the power source 414 will be closed. The other side of the circuit including the extractor solenoid 344 is made up of the conductor 436, contacts 433 and 434 of the toggle switch 299, conductors 435 and 437 and the remainder of the circuit previously described with reference to the pump solenoid 273 to the other side of the power source 414.

It will be remembered from the description of the construction of the pump unit 134 that when the solenoid 273 associated therewith is energized, the lever arm 266 actuated thereby disengages the hook portion 265 of the spring 262 so as to couple the pump pulley 133 into positive driving relation with a collar 259 secured to the pump shaft 252 and thereby operating the impeller 250 to draw the water from the tub 88 into the inlet connection 246 of the pump unit 134 discharging it through the outlet 248 for the pump chamber 247. The toggle switch 299 is operated by the lower diving bell 294 of the water level control unit 284 after the water has been removed from the tub by the pump unit 134, the extractor solenoid is energized and the basket 108 is set in motion through the operation of the transmission unit 131 and the clutch mechanism associated therewith from the motor 124. The pump unit 134 will continue to operate throughout the entire cycle of operation of the extractor unit since both are controlled from the cam disk 379 of the timer 363 and it is desirable to remove from said tub 88 any water withdrawn from the clothes or other articles being laundered by and in the course of the operation of the extractor.

It will be observed from Figure 24, that during this interval of operation the cam follower 384 will be in contact with the high point 441 of the cam disk 380, the cam follower 381 will be traversing the low point 453 of the disk 377 while the follower 383 traverses the low point 444 of disk 379. Contact is, therefore, broken between the contact arm 388 and its associated contact point 394 so that the agitator will not be operating, the contact arm 385 will be in contact with its associated contact point 390, whereby the motor 365 for the timer will be operating and the arm 387 will be in contact with its associated contact point 393 so that the extractor circuit will be closed.

It is advantageous at a point in the operation of the extractors to energize part of the mixing valve 234 so as to start the introduction of rinse water to the interior of the machine before the extractor unit actually ceases its operation. This is accomplished by causing the cam follower 382 for the arm 386 to contact the high point 449 of its cam disk 378 at an interval of one impulse or 37½ seconds prior to the end of the extractor cycle. This will cause the arm 386 to be raised from its intermediate position in which it was disposed by virtue of the fact that the cam follower 382 traverses the intermediate portion 448 of the disk 378 and brings the same into contact with upper contact point 391 and connecting into the circuit the conductor 438 which connects contact point 391 with the conductor 417 connected to the mixing valve 234 at a point between said mixing valve and the contact point 408 associated with the temperature control unit 238.

A time delay unit 439 is connected into the conductor 438 immediate of the ends thereof which are connected to contact point 391 and the conductor 417 thus, while the circuit will be completed with the mixing valve 234 ready to operate the time delay unit 439 will temporarily prevent its operation until such time as it may be desired to start the introduction of the rinse water to the apparatus. It has been found to be advantageous to start the entry of rinse water at an interval of approximately 10 seconds before the end of the operation of the extractor unit. The rinse water is, therefore, started to be introduced into the tub 88 a few seconds before the drying operation is discontinued, the time delay being employed to prevent an unnecessary waste of rinse water and yet assisting in the removal of scum, calcium deposits or like accumulations within the basket 108.

The shaft 366 of the timer unit 363 is not rotated since motor 365 is stopped during the interval in which the rinse water is admitted. When the tub 88 is filled with rinse water, the upper diving bell 293 closes the toggle switch 307 and motor 124 together with motor 365 is started up again, the latter causing shaft 366 to be rotated. The cam follower 384 now engages the low point 442 of disk 380 and the agitator will again begin to operate by reason of the contact arm 388 completing the circuit by contacting its associated contact point 394.

Contemporaneously the cam follower 383 will traverse the raised portion 445 of the disk 379 thereby disengaging contact between the arm 387 and contact point 393 so as to halt the operation of the extractor unit and stop basket 108. At the same time, the cam follower 382 of the arm 386 is positioned on the high point 449 on the cam disk 378 maintaining contact between the arm 386 and the contact point 391 for the mixing valve 234 to be energized so that the introduction of the rinse water begun a few seconds before the extractor ceases operation continues until the toggle switch 307 is operated by upper diving bell 293. The agitator 117 is operated for the second time when the tub 88 is full of rinse water. During the interval in which the tub 88 is being filled, as we have seen, the electrical circuit for the operation of the motor 365 of the timer unit 363 is broken stopping the motor temporarily because the cam follower 381 of the arm 385 will be traversing the surface 454 of the disk 377 and will, therefore, cause the arm 385 to be supported temporarily in an intermediate position between the contact points 389 and 390 associated therewith.

The cessation of operation of the motor 365 is only for the period required by the mixing valve 234 to fill the tube 88 with water so that the upper diving bell 293 will again close the contacts 421 and 425 of the toggle switch 307 so as to complete the circuit through conductors 426, 427 and 432 to the motors 124 and 365. The motor 365 again causes the shaft 366 of the timer unit 363 to rotate so that the cam disks 377 to 380, inclusive, are again caused to rotate.

At the conclusion of the rinsing period, during which the agitator 117 is actuated, the cam follower 384 of the contact arm 388 will have traversed the low point 442 on the disk 380 by virtue of the rotation of the shaft 366 in the manner just described and will now contact the surface 457 of the disk 380 thereby breaking engagement between the contact arm 388 and its contact point 394 stopping the operation of the agitator 117. At this point in the operation, the cam follower 383 of the arm 387 will contact the surface 446 of the disk 379 and contact will be established between the contact arm 387 and its associated contact point 393 so as to bring the extractor unit again into operation. The cam follower 382 during this interval continues to traverse the intermediate portion 450 of the disk 378 so that the contact arm 386 will be disposed intermediate of its contact points 391 and 392.

The cam follower 381 will also drop down to the surface 455 of the cam disk 377 again causing the contact arm 385 to engage its associated contact point 390 completing the circuit through the motor 365 to maintain its operation when the water is removed from tub 88 by pump unit 134 breaking contact with contact 425 of toggle switch 307.

It will be understood that the same operation with respect to the extractor unit takes place during this cycle as was the case following the original operation of the agitator, namely, that the pump solenoid 273 will first be energized through the engagement of the contact arm 387 with its associated contact point 393. The pump 134 will begin extracting the water from tub 88 but the extractor unit will not begin operation until the lower diving bell 294 actuates the toggle switch 299 to close the contacts 433 and 434 thereof to complete the electrical circuit to the extractor 344 which will start the basket 108 rotating.

The cam disks 377 to 380, inclusive, shown in Figures 23 and 24 have been cut to provide cycles of operation as indicated by the chart in Figure 25. The cutting of the disks 377 to 380, inclusive, has been based upon experience as to the length of time desirable for each operation of the automatic washing machine. It has been found to be most advantageous to provide a washing cycle of approximately 20 minutes in length as is represented by the first black line in the chart which indicates the time during which the agitator is oscillated.

The fourth black line in the chart indicates the length of time that the pump 134 is in operation for withdrawing water from the tub 88 after the washing operation is completed. It will be observed that the pump 134 started operating immediately but that while the extractor unit which as indicated by the fifth heavy black line, is simultaneously connected into the electrical circuit, its operation does not begin until substantially all of the water has been removed from the tub 88. As indicated by the sixth heavy black line on the chart of Figure 25, the mixing valve 234 is connected into the circuit by which it is operated at a point in the extractor cycle just one impulse prior to the discontinuance of operation of the extractor unit. The mixing valve 234 as has been previously explained is, however, not opened to admit water to the tub 88 for the rinsing cycle until after a part of this time interval has elapsed. It is most advantageous to allow approximately 10 seconds before the extractor stops operating to introduce rinse water to the tub 88.

After the rinse water has been admitted to the tub 88 the agitator 117 is connected into its circuit again as indicated by the seventh black line upon the chart but is not energized until the water level control unit 284 indicates the tub 88 is filled. After the conclusion of the rinsing operation, the agitator is halted and the pump unit 134 and extractor unit are again connected into the electrical circuit but, as before, the pump unit 134 operates first to withdraw substantially all of the water from the tub 88 before the extractor unit begins to operate. This cycle which represents the final drying operation is represented by the eighth and ninth heavy black lines upon the chart.

The last heavy black lines shown on the chart of Figure 25 represent the motor control cycle which is set up during that interval in the operation of the machine at the instant the water is being withdrawn from the tub 88. In order to operate the motors 124 and 365, the auxiliary circuit above described is energized through the timer 363, the disk 377 thereof being cut as at 453 and 455 to permit the contact arm 385 to engage contact 390 thereby closing this auxiliary circuit.

It will be apparent from the foregoing that in the event of a water failure of any kind, the agitator 117 will not operate. Similarly, in the event of an electrical failure, the water will not enter the tub 88.

Since it is obvious that some clothes or articles to be laundered may require less washing time than others, it has been found advantageous to arrange the construction of the control mechanism and the control circuit in such a manner that the wash cycle may be shortened to a period less than 20 minutes. This can be accomplished by simply raising the control knob 55, rotating it in a clockwise direction, and setting it at some desired indicated point of time on the indicator scale. The drying and rinsing cycles however cannot be shortened except by interrupting the normally continuous cycle of operation. This feature has been found desirable since it takes a certain definite period of time to remove all of the soap or other alkaline solutions employed as a detergent in the cleansing medium out of the clothes, and for the reason that the ordinary user of the machine should not, therefore, be given an opportunity to shorten the rinse cycle. It has similarly been found to be unnecessary to provide any adjustment in the drying time.

*Summary of operation*

The complete operation of the automatic washing machine representing the illustrated embodiment of the invention and described herein in detail may be briefly summarized as follows:

Clothes or other articles to be laundered are inserted into the basket 108 of the automatic washing machine through the lid 45 in the cover 41 of cabinet 40 and a small amount of soap or other suitable detergent is then sprinkled on the top of the clothes or articles to be laundered. The temperature control knob 54 is now set for the desired water temperature at which the clothes or other articles are to be laundered. The timer knob 55 is raised and turned in a clockwise direction until the pointer 370 thereof is opposite the point upon the dial 458 which indicates the desired length of time for the duration of the washing cycle.

By way of illustration let us assume that the operator desires to have the washing cycle last for 15 minutes. The knob 55 is raised and rotated in a clockwise direction until the pointer 370 thereof is opposite the numeral 15 on the calibrated scale 458 upon which each mark represents the time interval of one minute. The knob 55 is then lowered thereby setting into motion the control circuit which operates the automatic washing machine which has already been connected to a suitable source of electrical energy such, for example, as a conventional convenience outlet. The apparatus is thereafter adapted to operate without further attention, all of the remaining operations taking place automatically and proceeding to the completion of the last drying operation.

When the control circuit is energized, the flow of water into the tub 88 is commenced by the operation of the mixing valve 234 which operates to commingle the proper quantities of hot and cold water to produce a water supply of the desired temperature depending upon the setting of the control knob 54 for the temperature control 238. When the tub 88 fills up to a point where the upper diving bell 293 is raised, the toggle switch 307 opens the circuit into which the mixing valve 234 is connected and closes the circuit energizing the agitator 117. The agitator 117 now continues in operation for a period of 15 minutes by virtue of the setting of the control knob 55 for that time interval. It will be understood that if at any time the water level should fall below a predetermined point within the tub 88, the mixing valve 234 will again be opened to replace the water lost and the agitator 117 will be temporarily stopped during the period of time that the water is replaced.

After the completion of the washing cycle, the agitator circuit is opened by virtue of the operation of the timer 363 at the contact 394 and the pump 134 is operated to withdraw the water from the tub 88. When substantially all of the water has been removed from the tub 88 by the pump 134 the extractor circuit is closed at the contact 433 by reason of the fact that the lower diving bell 294 drops down due to the lowering of the water level thereby actuating the toggle switch 299, thereby setting in motion the basket 108. The lower diving bell 294 insures against the possibility of the basket 108 being rotated while any water still remains in the tub 88. The basket 108 which carries the wet clothes or other articles following their laundering is rotated at a high speed and the centrifugal action causes the removal of the water therefrom by passing the same through the perforations 110 in the basket 108. The pump 134 which continues to operate during this cycle serves to remove the water from the tub 88 and prevents accumulation of water from building up therein.

It will be noted from the description of the structure of the water level control unit 284 that the hose 292 to the cylindrical member 285 is advantageously connected to the sump 239 which extends below the base 90 of tub 88. This arrangement causes the lower diving bell 294 to raise so as to open the extractor circuit by actuating the toggle switch 299 and stop the rotation of the basket 108 in the event that any water accumulates in the base of tub 88 above the location of the connection 291 for hose 292 in the sump 239. It has been found that if water is permitted to remain in the base 90 of tub 88 to a depth sufficient to touch the bottom of the basket 108, the high speed of rotation of said basket 108 results in the formation of a large quantity of suds between the basket and tub 88 forming a so-called "suds lock" which greatly reduces the speed of operation of the basket 108 and affects the efficiency of the drying operation.

Such a condition is not possible in the apparatus of the present invention. As soon as the water rises in the sump to a level above the connection 291 in sump 239 the lower diving bell 294 is raised and the extractor circuit through toggle switch 299 is immediately broken. The drying basket 108 is thus halted until the water is removed by pump unit 134 when the diving bell 294 again energizes the extractor circuit causing the basket 108 to resume its operation.

The basket 108 is rotated in this fashion for a total time of approximately 4½ minutes. At a point approximately 10 seconds prior to the cessation of operation of the basket 108 the mixing valve 234 is opened and rinse water is admitted to the tub 88. This short interval of time representing an overlap in the extracting and rinsing operation affords an opportunity for the whirling basket 108 to assist in the removal of the accumulation of scum, calcium deposits or other like formations which may remain upon the clothes or other articles carried by the basket 108. The extractor circuit is now opened by the operation of the timer 353 and the basket 108 ceases its rotation by the action of the braking means including the disk 228 and the braking surface 206 of the mechanism associated with the operation of the hollow shaft 101 which carries the basket 108.

As soon as the tub 88 is filled with rinse water, the upper diving bell 293 rises shutting off the mixing valve 234 and energizing the agitator control circuit so that the agitator 117 is set into motion. At the conclusion of the rinsing cycle, the agitator circuit is again de-energized and the operation of the agitator 117 is halted. The pump circuit is again energized and, as in the previous instance, after the pump 234 has removed substantially all of the water from the tub 88, the extractor circuit is closed and the basket 108 is started to rotate. The basket 108 continues to whirl at high speed for approximately seven minutes, at the end of which time its circuit is de-energized and the cycle of operation is complete.

It will be noted from the inspection of the several cam disks 377 to 380, inclusive, that the shape thereof is such that at the conclusion of the last drying cycle the contact arms 385 and 386 associated with cam disk 377 and 378 will be disposed in intermediate position between their associated contact points 389 and 390 and 391 and 392 respectively while contact arms 387 and 388 will be supported out of contact with their respective contact points 393 and 394 which means that all of the circuits are de-energized. It will, therefore, be unnecessary for the operator to be present at the end of the complete cycle of operation, since the machine and control circuit is automatically completely de-energized.

The use of the weighted collar 122 in association with the assembly of the tub 88, drying basket 108 and agitator 117 all of which are floatingly supported on spider 70 within the cabinet 40 by the suspension members 71 is an important feature of the present invention. When the articles to be laundered are placed in the basket 108 by the operator, it frequently happens that due to the size and weight of certain of the articles, the agitator 117 is unable to distribute them within the basket 108. Consequently when the water is drained from the apparatus the load of laundered articles in basket 108 may be unevenly distributed and, therefore, when the extractor unit is started the unbalanced load will set up excessive lateral movement of the freely floatingly mounted units due to the uneven gyrations of the basket 108.

The extent of this lateral movement may be reduced by increasing the mass of the spider 70 and thus increasing the inertia of the floating units. In apparatus in which a high unbalanced load is experienced, it is frequently necessary to add a rather considerable weight to the structure. It has been found that the same result may be accomplished with a much reduced weight by placing the weight at or near the uppermost end of the tub 88 rather than in the spider 70. The weighted collar 122 is advantageously mounted upon annular member 121 and effectively increases the inertia of the floating base thereby greatly decreasing the extent of the lateral motion of the freely floatingly mounted units and reducing the vibration in the cabinet 40 to a minimum in spite of unbalanced loads in the basket 108.

It is to be noted that the hollow chambers 460 in pulley 132 of the extractor drive unit and 461 in pulley 133 of pump unit 134 (Figure 8) may advantageously be filled with a suitable lubricating medium for maintaining positive lubrication of the bushings 189 and 256, respectively. The bushings 189 and 256 may advantageously be fabricated from a relatively porous material such, for example, as oilite or the like. Thus, when pulley 132 and pulley 133 are not rotated the lubricating medium is permitted to permeate bushings 189 and 256 obviating the necessity of periodic attention. When the pulley 132 and pulley 133 are rotated the lubricating medium is thrown out against the walls of chambers 460 and 461, respectively and preventing leakage thereof in operation.

A similar construction is provided in the bearings associated with the mountings for the hollow shaft 101 and shaft 113. A pocket 462 may advantageously be formed between a porous sleeve bearing 99 and the wall of the counterbore 100 in the upper end of the center post 98 for lubricating medium. The porous sleeve bearing 112 for the shaft 113 is lubricated by suitable lubricating medium contained in the pocket 463 in the upper end of hollow shaft 101.

While we have shown and described particular embodiments of our invention it will, of course, be understood that we do not wish to be limited thereto since many modifications may be made and we, therefore, contemplate by the appended claims to cover all such modifications as may fall within the true spirit and scope of our invention.

We claim:

1. An automatic washing machine comprising a tub, a centrifuge within said tub for receiving articles to be laundered, power means for rotating said centrifuge, a chamber having at least one fluid level responsive member therein, a fluid connection between said chamber and the bottom of said tub, a fluid supply conduit positioned to deliver fluid to said centrifuge and having an inlet valve therein, electrically operated means for draining fluid from said tub, cycling mechanism for opening and closing said valve, for energizing said means for draining fluid from the tub and for energizing said power means at predetermined times in a cycle of operation, and a by-pass conduit leading directly to the top of said chamber from said fluid supply conduit and the discharge side of said valve, said cycling mechanism including means for opening said valve for a predetermined time interval during energization of said means for draining fluid from said tub, flush said chamber and fluid level responsive member after the fluid has been drained from said tub.

2. An automatic washing machine comprising a tub, a centrifuge within said tub and having an open top for receiving articles to be laundered, power means for rotating said centrifuge, a chamber having at least one fluid level responsive member therein, a fluid connection between said chamber and the bottom of said tub, a fluid supply conduit positioned to deliver fluid to said centrifuge and having an inlet valve therein, electrically operated means for draining fluid from said tub, cycling mechanism for opening and closing said valve, for energizing said means for draining fluid from the tub and for energizing said power means at predetermined times in a cycle of operation, and a by-pass conduit extending into the top of said chamber from said fluid supply conduit and being in open connection therewith on the centrifuge side of said valve, said cycling mechanism including means for opening said valve while said means for draining fluid is energized.

3. An automatic washing machine comprising a tub, a centrifuge within said tub and having an open top for receiving articles to be laundered, power means for rotating said centrifuge, a chamber having at least one fluid level responsive member therein, a fluid connection between said chamber and the bottom of said tub, a fluid supply conduit positioned to deliver fluid to said centrifuge through the top thereof and having an inlet valve therein, electrically operated means for draining fluid from said tub, cycling mechanism for opening and closing said valve, for energizing said means for draining fluid from said tub and for energizing said power means at predetermined times in a cycle of operation, and means for feeding fluid from said fluid supply conduit into the top of said chamber at a predetermined time in the cycle of operation near the end of said time when said means for draining fluid is energized.

4. An automatic washing machine comprising a tub, a centrifuge within said tub and having an open top for receiving articles to be laundered, power means for rotating said centrifuge, a chamber having at least one fluid level responsive member therein, a fluid connection between said chamber and the bottom of said tub, a fluid supply conduit positioned to deliver fluid to said centrifuge through the open top thereof and having an inlet valve therein, electrically operated means for draining fluid from said tub, cycling mechanism for opening and closing said valve, for energizing said means for draining fluid from said tub and for energizing said power means at predetermined times in a cycle of operation, and means for feeding fluid from said fluid supply conduit into the top of said chamber and tub during at least a portion of the time when said means for draining fluid from said tub is energized and also while said power means is energized.

5. An automatic washing machine comprising a tub, a clothes receiving fluid extractor basket rotatably mounted within said tub and having an open top, power means for rotating said basket, said tub having a relatively small sump depending below the bottom of said tub and in open communication therewith, a chamber having a plurality of fluid level responsive members at different heights therein, a fluid connection between said chamber and said sump, one of said members being movable in response to a change in fluid level at a predetermined point within said sump and below the bottom of said tub, electrically operated means for draining fluid from said tub through said sump, a fluid supply conduit positioned to deliver fluid to said tub through the top thereof and having an inlet valve therein, means for opening said valve, means responsive to upward movement of a second one of said members for closing said valve, and cycling mechanism for energizing said means for draining fluid from said tub and for energizing said power means at predetermined times in a cycle of operation, and means for opening the energization circuit of said means for rotating said basket whenever the fluid level in said sump is above said predetermined point, whereby said sump provides fluid for actuating said first one of said fluid level responsive members while said tub remains empty of fluid.

6. In an automatic washing and drying machine, a tub, a basket mounted within said tub for rotation about a vertical axis and having an open top for receiving the articles to be laundered, a motor, disconnectible means driven by said motor for rotating said basket, a sump depending from the bottom of said tub, a float control chamber fixedly mounted to extend along one side of the tub and depend beneath the bottom thereof and having a float therein, a conduit connecting said sump to the lower portion of said chamber, switching means operated by said float upon the rise of liquid in said chamber to a predetermined level beneath the bottom of said tub, to disconnect said motor from said basket, a pump, a fluid connection from said pump to said sump, to withdraw fluid from said sump, tub and float control chamber, a fluid supply conduit positioned to deliver fluid through the open top of said basket, a valve in said conduit, cycling mechanism operatively connected with said valve and pump, to open and close said valve and stop and start said pump at predetermined time intervals, and a by-pass conduit leading from the discharge side of said valve to the top of said float control chamber, and by-passing fresh water from said supply conduit, to flush said float and float control chamber, and means operated by said cycling mechanism and connected to open said valve and supply water to said basket and float control chamber and flush scum therefrom after fluid has been drained from said tub and sump and before the filling of said tub for rinsing purposes.

7. In an automatic washing and extracting machine, an open top tub, a clothes containing basket open at its top and mounted within said tub for rotation about a vertical axis, power means for rotating said basket to extract liquid therefrom, including a rotatably driven member and a clutch connecting said member to said basket, a sump depending from the bottom of said tub to one side of the center thereof, a float control chamber disposed to one side of said tub and depending beneath the bottom thereof, a float therein adjacent the lower end thereof and operatively connected to effect disengagement of said clutch and stop rotation of said basket upon the entrance of water therein to a predetermined level beneath the level of the bottom of said tub, a pump connected to said sump to withdraw fluid from said sump, tub and float control chamber, a fluid supply conduit positioned to deliver fluid through the open top of said tub, a valve in said conduit, another float in said chamber disposed above said first mentioned float and operatively connected with said valve to open and close said valve depending upon the level of liquid in said chamber and tub, and a by-pass conduit leading from the discharge side of said valve to the top of said chamber, to wash scum therefrom, and cycling mechanism controlling the cycle of operation of said machine and connected to open said valve independently of said second float, at the end of the extracting operation when said float control chamber is empty.

8. In an automatic washing machine, a tub, a basket mounted with said tub for rotation about a vertical axis and having an open top for receiving the articles to be laundered, a motor, a drive connection from said motor to said basket, for rotating said basket including a driving member and a driven member and a clutch connected therebetween, a sump depending from the bottom of said tub and offset from the axis of rotation of said basket, a float control chamber mounted to extend along one side of said tub and depending therebeneath, a float therein adjacent the lower end thereof, a fluid connection from said sump to said float control chamber, connected to said chamber adjacent the lower end thereof, a pump, a connection from said pump to the bottom of said pump to evacuate fluid from said sump, tub and float control chamber, a fluid supply conduit positioned to deliver fluid to said basket through the open top thereof, a valve in said conduit controlling the passage of fluid therethrough, a second float in said float control chamber, an operative connection between said second float and valve, to open and close said valve depending upon the level of liquid in said float control chamber, cycling mechanism connected with said valve to open and close said valve at certain periods in the cycle of operation of said machine and an operative connection from said first mentioned float to said clutch, for disengaging said clutch upon a rise in the level of liquid in said float control chamber to a point beneath the bottom of said tub.

PETER EDUARD GELDHOF.
LUTHER RINGER.

REFERENCES CITED

The following references are of record in the file of this patent:

UNITED STATES PATENTS

| Number | Name | Date |
|---|---|---|
| 1,005,093 | Wilson | Oct. 3, 1911 |
| 1,179,537 | Mapel | Apr. 18, 1916 |
| 1,223,584 | Huebsch | Apr. 24, 1917 |
| 1,270,901 | Watrous | July 2, 1918 |
| 1,410,384 | De Martino | Oct. 21, 1922 |
| 1,819,665 | Wiltse | Aug. 18, 1931 |
| 1,828,104 | Divekey | Oct. 20, 1931 |
| 1,889,280 | Edgren | Nov. 29, 1932 |
| 1,891,842 | Schmid-Doman | Dec. 20, 1932 |
| 1,999,439 | Braun | Apr. 30, 1935 |
| 2,009,365 | Wait | July 23, 1935 |
| 2,035,083 | Mattern | Mar. 24, 1936 |
| 2,147,302 | Lang | Feb. 14, 1939 |
| 2,150,638 | Scott | Mar. 14, 1939 |
| 2,165,884 | Chamberlin | July 11, 1939 |
| 2,188,353 | House | Jan. 30, 1940 |
| 2,218,698 | Clark | Oct. 22, 1940 |
| 2,236,748 | Chayle | Apr. 1, 1941 |
| 2,259,437 | Dean | Oct. 21, 1941 |
| 2,268,204 | Dunham | Dec. 30, 1941 |
| 2,278,911 | Breckenridge | Apr. 7, 1942 |
| 2,288,141 | Oliver | June 30, 1942 |
| 2,296,262 | Breckenridge | Sept. 22, 1942 |
| 2,302,923 | Zimarik | Nov. 24, 1942 |
| 2,311,924 | Bassett | Feb. 23, 1943 |
| 2,314,286 | Olcott | Mar. 3, 1943 |
| 2,344,253 | Kirby | Mar. 14, 1944 |
| 2,344,982 | Dyer | Mar. 28, 1944 |
| 2,347,190 | Geldhof et al. | Apr. 25, 1944 |
| 2,356,816 | Breckenridge | Aug. 29, 1944 |
| 2,357,909 | Ridge | Sept. 12, 1944 |
| 2,401,476 | Geldhof et al. | June 4, 1946 |

FOREIGN PATENTS

| Number | Country | Date |
|---|---|---|
| 477,254 | England | 1937 |